(12) United States Patent
Lee et al.

(10) Patent No.: US 6,870,962 B2
(45) Date of Patent: Mar. 22, 2005

(54) METHOD AND APPARATUS FOR EFFICIENTLY ENCODING CHROMATIC IMAGES USING NON-ORTHOGONAL BASIS FUNCTIONS

(75) Inventors: Te-Won Lee, San Diego, CA (US); Thomas Wachtler, Freiburg (DE); Terrence J. Sejnowski, Solana Beach, CA (US)

(73) Assignee: The Salk Institute for Biological Studies, La Jolla, CA (US)

( * ) Notice: Subject to any disclaimer, the term of this patent is extended or adjusted under 35 U.S.C. 154(b) by 764 days.

(21) Appl. No.: 09/846,485

(22) Filed: Apr. 30, 2001

(65) Prior Publication Data

US 2002/0191844 A1 Dec. 19, 2002

(51) Int. Cl.$^7$ .............................. G06K 9/36; G06K 9/46
(52) U.S. Cl. ........................ 382/248; 382/240; 382/233
(58) Field of Search ................................. 382/248, 240, 382/233, 266, 232, 253, 224, 162

(56) References Cited

U.S. PATENT DOCUMENTS

| | | | |
|---|---|---|---|
| 5,706,402 A | 1/1998 | Bell | 395/23 |
| 5,956,431 A | 9/1999 | Iourcha et al. | 382/253 |
| 6,195,456 B1 | 2/2001 | Balasubramanian et al. | 382/167 |
| 6,212,235 B1 * | 4/2001 | Nieweglowski et al. | 375/240.08 |

OTHER PUBLICATIONS

Nachtergaele, "JPEG–200 Wavelet Demo", *Multimedia Compression Systems*, IMEC (Feb. 27, 1998).
Párraga, et al., "Color and luminance information in natural scenes" *J. Opt. Soc. Am. A*, vol. 15, No. 3, pp. 563–569 (Mar. 1988).
Rudeman, "Statistics of cone responses to natural images: implications for visual coding", *J. Opt. Soc. Am. A*, vol. 15, No. 8, pp. 2036–2045 (Aug. 1998).
Sammis, "What's in a JPEG?", *MacADDICT*, p1 (Jul. 2000).
Santa–Cruz, et al., "JPEG 2000 still image coding versus other standards", Coding of Still Pictures: An analytical study of JPEG 2000 functionalities, *ISO/IEC JTC1/SC29/WG1 N1816*, pp. 1–10, (Jul. 2000).
Wachtler, et al., "Chromatic structure of natural scenes", *J. Opt. Soc. Am. A*, vol. 18, No. 1, pp. 65–77, (Jan. 2001).
"JPEG 2000 Standardization Moving Quickly", Coding of Still Pictures: JPEG 2000 Press Release–Rochester, *ISO/IEC JTC1/SC29/WG1 N1861*, (Aug. 18, 2000).

(List continued on next page.)

*Primary Examiner*—Phuoc Tran
(74) *Attorney, Agent, or Firm*—Morrison & Foerster LLP

(57) ABSTRACT

A method and apparatus for efficiently encoding images using a set of non-orthogonal basis functions, thereby allowing reduction of file size, shorter transmission time, and improved accuracy. The non-orthogonal basis functions include homogenous color basis functions, luminance-encoding basis functions that have luminance edges and chromatic basis functions that exhibit color opponency. Some of the basis functions are non-orthogonal with respect to each other. Using these basis functions, a source vector is calculated to provide a number of coefficients, each coefficient associated with one basis function. The source vector is compressed by selecting a subset of the calculated coefficients, thereby providing an encoded vector. Because the method is highly efficient, the image data is substantially represented by a small number of coefficients. In some embodiments, the non-orthogonal basis functions include two or more classes. A wavelet approach can also be utilized.

73 Claims, 19 Drawing Sheets

(2 of 19 Drawing Sheet(s) Filed in Color)

OTHER PUBLICATIONS

"FCD 14495, Lossless and near–lossless coding of continuous tone still images (JPEG–LS)", *ISO/IEC JTC 1/SC 29/WG 1 FCD 14495–public draft*, (Jul. 16, 1997).

"What is JPEG?", http://www.faqs.org/faq/jpeg-faq/part1/section-1.html.

"Why use JPEG?" http://www.faqs.org/faq/jpeg-faq/part1/section-2.html.

"How well does JPEG compress images?" http://www.faqs.org/faq/jpeg-faq/part1/section-4.html.

"What are good "quality" settings for JPEG?" http://www.faqs.org/faq/jpeg-faq/part1/section-5.html, pp. 1–2.

"What about arithmetic coding?" http://www.faqs.org/faq/jpeg-faq/part1/section-18.html.

* cited by examiner

NOTE: Total of T Patches in Array
M x N Array of Pixels in Patch t
Total Number of Pixels = P
Number of Datapoints per pixel = R
Total Number of Pixel Datapoints = P x R = N DATA VECTOR FOR PATCH t: $(x_t) = [Z_1, Z_2, ..., Z_P]$
$(x_t) = [x_1, x_2, x_3, ..., x_n, ..., x_N]^T$

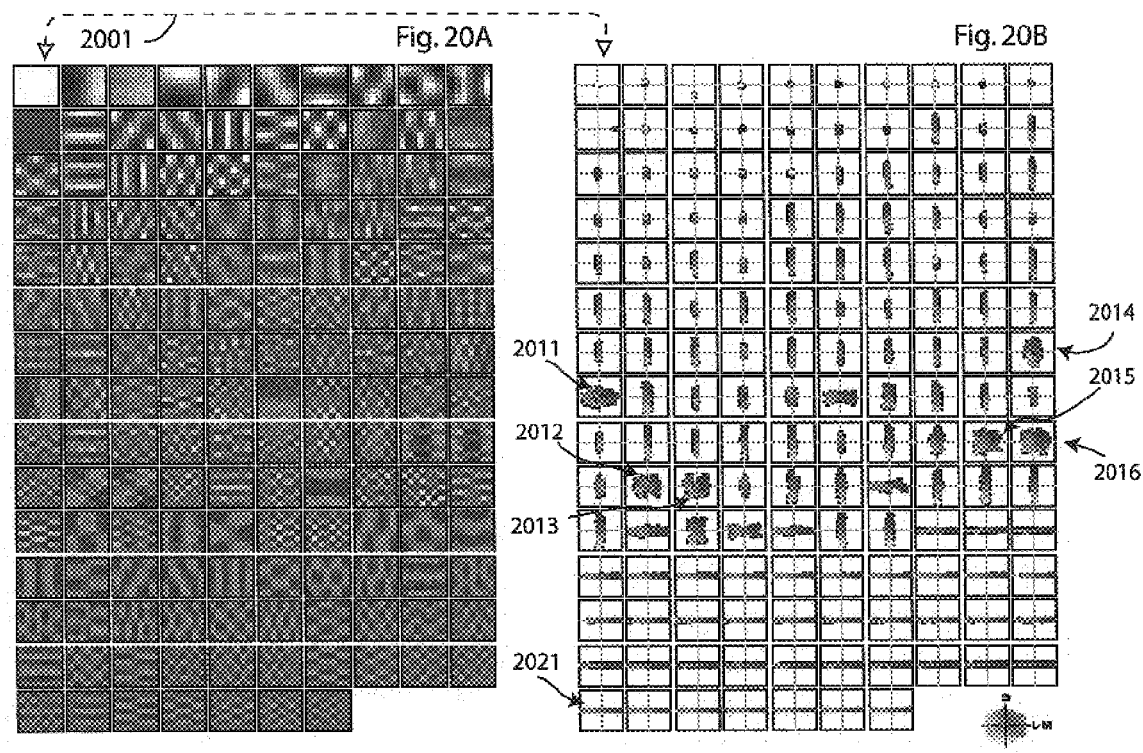

METHOD AND APPARATUS FOR EFFICIENTLY ENCODING CHROMATIC IMAGES USING NON-ORTHOGONAL BASIS FUNCTIONS

BACKGROUND OF THE INVENTION

1. Field of the Invention

The present invention generally relates to computer-implemented systems and methods for encoding, compressing, and decoding images.

2. Description of Related Art

Image compression techniques are widely used to store images in digital form in computers, and to transmit the images over networks such as the Internet. Image compression techniques utilize the principle that images contain a great deal of redundant data. By reducing the redundancy, image compression processes achieve a smaller file size, which can be very useful. For example, a small file size reduces the storage requirements for the image. Also, smaller files transfer more quickly over a network.

Over time, standards have evolved for image compression and file format storage. One particular standard commonly referred to as JPEG (which is an acronym for Joint Photographic Experts Group) is widely used to transfer still images over the Internet. This JPEG standard specifies a type of lossy data compression that does not exactly reproduce the original image but provides acceptable image quality. For example, the reduction in image quality may be barely perceptible, or even if perceptible, the smaller file size compensates for the reduced image quality for most uses. As part of the JPEG standard, a quality factor can be chosen when the image is compressed, which determines how much compression versus how much loss in image detail is desired. Although some types of images can be compressed with little loss, in many instances the greater the amount of compression, the greater the corresponding loss of image quality.

To compress an image according to the JPEG standard, the image is first divided up into 8×8 patches, each patch containing 64 pixels. Based upon the pixel values in this patch (typically a red value, a green value, and a blue value are associated with each pixel), certain values are calculated using basis functions predetermined by the JPEG standard. These calculated values then represent the image. To reconstruct the image, the calculated values are decoded using the predetermined basis functions to recreate the image.

JPEG 2000 is new standard proposed by JPEG that uses a wavelet approach to more accurately encode an image. In the wavelet approach, a large patch (possibly the entire image at the top level) is encoded, then the patch is processed which includes subdividing the large patch into smaller patches. The smaller, subdivided patches are then encoded, and these patches are re-subdivided and encoded. This process is repeated—subdividing and encoding progressively smaller patches—until a predetermined patch size (or other criteria), has been met. To decode an image encoded according to the wavelet approach, each of the encoded patches is sequentially decoded and displayed.

Even with a great deal of compression, JPEG files are large. It would be an advantage to provide a system that can significantly reduce the size of compressed files while retaining high image quality, thereby occupying less storage space, and reducing transmission time.

SUMMARY OF THE INVENTION

The method and apparatus described herein encodes images using basis functions that efficiently represent the image data, thereby reducing the file size of an encoded image and/or improving accuracy of the encoded image. At least one basis function is non-orthogonal to at least one other basis function. The basis functions include homogenous color basis functions, luminance-encoding basis functions that represent luminance edges and chromatic basis functions that exhibit color opponency. In one embodiment disclosed herein, a large percentage of the predominant basis functions (i.e. the basis functions that have the most contribution) primarily encode grayscale features of the image, and the chromatic basis functions primarily encode color in a color-opponent way, defining an axis in color space. Non-orthogonal basis functions can be seen in at least two ways: 1) in vector space; 2) in the color space of the basis functions; particularly, the color-opponent basis functions typically include at least two basis functions whose axes of color opponency are non-orthogonal to each other.

In the encoding method described herein, the image is divided into one or more patches, each patch defining at least one data vector. The data vector is encoded by applying a non-orthogonal set of basis functions to provide a source vector that includes a plurality of calculated coefficients having values representative of the patch. The source vector is compressed by selecting a subset of the plurality of calculated coefficients, thereby providing an encoded vector.

Because the method described herein is more efficient, the image data is substantially represented by a lesser number of the basis functions than previous methods. In other words, the method described herein provides a sparse representation of the image, which means that a large number of the calculated coefficients are clustered around zero, and therefore do not make a significant contribution to the image. The near-zero coefficients and their associated basis functions can be eliminated during compression to reduce the size of the encoded data file while not significantly degrading the image. The resulting subset of coefficients, together with associated compression designations, such as the compression technique used, comprises the encoded data.

ICA basis functions are obtained in a training process in which a large number of datasets (herein the datasets is a set of image patches) are processed in a repeating manner to find the basis functions that most appropriately can be used to describe the images in the chosen image set. In one described embodiment, the ICA basis functions were trained in the LMS color space. By observing the images defined by the ICA basis functions (the "basis patches") it was observed that a high percentage of the predominant basis functions encode primarily luminance and not color. Furthermore, those basis functions that represented color exhibit color opponency along non-orthogonal axes. These results indicate that the ICA basis functions can more efficiently encode data.

In some embodiments, the non-orthogonal basis functions include two or more classes, and the step of encoding the patch includes calculating the source vectors for each of the classes, classifying the patch into one of the classes, and selecting the source vector associated with the class.

Many different techniques for selecting the subset of coefficients are possible. For example, a predetermined coefficient technique includes selecting a plurality of coefficients having predetermined positions within the source vector, thereby selecting coefficients associated with predetermined basis functions. A highest value selection method includes selecting a group of coefficients by selecting the largest coefficient values. A threshold method includes selecting coefficients whose values exceed a predetermined threshold.

A wavelet approach is described in which an image is encoded by dividing the image into patches, encoding the patches using non-orthogonal basis functions, processing each patch including subdividing the patches into a plurality of smaller patches, and then repeating the process until the subdivided patches reach a predetermined size or another criteria is reached indicating that encoding is complete, which may require three or more repetitions. A pyramid technique is described in which a difference image patch is calculated at each level, and the difference patch provides the patch that is subdivided at the next level. The difference patch is obtained by subtracting the encoded image data from the image patch.

In some embodiments each of the basis functions have a probability density function (pdf) variable associated therewith that designates the underlying statistical distribution, such as sub-Gaussian, normal Gaussian, and super-Gaussian. In such embodiments, the image data is encoded using the pdf variables associated with the basis functions.

The plurality of encoded vectors comprise the compressed image information, which is stored and transmitted as desired. When the image is to be viewed, the plurality of encoded vectors are decoded to provide a plurality of reconstructed data vectors. These in turn are used to reconstruct the image data in a format suitable for display.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

For a more complete understanding of this invention, reference is now made to the following detailed description of the embodiments as illustrated in the accompanying drawing, wherein:

FIG. 20A is a diagram of the image patches for the PCA basis functions (the "PCA basis patches") in one example in which the PCA basis functions were trained using the LMS color space; and FIG. 20B is a diagram of the color space corresponding to each PCA basis function shown in FIG. 20A.

DETAILED DESCRIPTION

Figure 1:
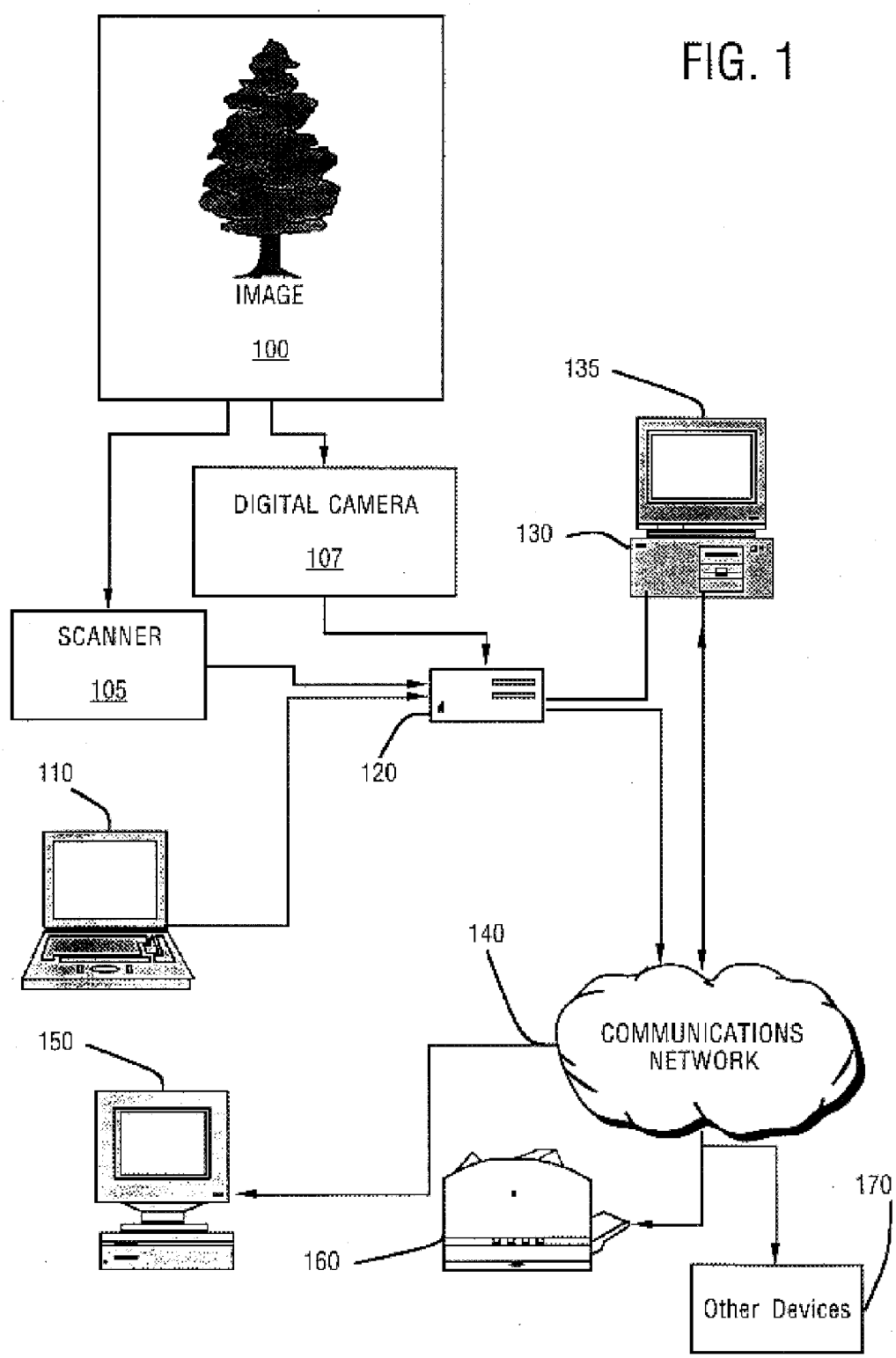
FIG. 1 is a diagram illustrating an image, image capture devices, digital processing devices, computers, and a communication network such as the internet connected to a number of remote devices.

This invention is described in the following description with reference to the Figures, in which like numbers represent the same or similar elements.

As used herein, the term "encoding" is used in a general sense to include calculations for processing raw image data and/or compression processes.

In some instances, reference may be made to "basis functions" or "basis vectors", which are defined by the columns of the basis matrix. For example, the basis functions for class k are defined by the column vectors of the matrix for that class k. Unless otherwise indicated the basis functions disclosed herein should be considered ICA basis functions, which are defined as basis function that have been learned (or "trained") using ICA processes, resulting in basis functions that are substantially non-orthogonal.

"Color space" refers to the particular standards used to define color; for example red-green-blue (RGB) and cyan-magenta-yellow (CMY) are two commonly-used color spaces. Another color space referenced herein is the LMS color space, which is approximately equivalent to the RGB color space for some applications; however the LMS space differs from the RGB space in that the LMS color space is defined in such a way that the L, M, and S values approximately match the response of the long (L), medium (M), and short-wavelength selective (S) cones, which are the three types of cone photoreceptors in the human eye. Thus, the LMS color space represents a color as a linear combination that approximates the response of the human eye to that color.

The following symbols are used herein to represent the certain quantities and variables. In accordance with conventional usage, a matrix is represented by an uppercase letter with boldface type, and a vector is represented by a lowercase letter with boldface type.

Tabble of Symbols

| | |
|---|---|
| $A_k$ | matrix of basis functions for class k (elements are $a_{ij}$ for class k) |
| $A^{-1}$ | Filter matrix, inverse of A |
| $A^T$ | Transpose of A |
| $b_k$ | bias vector for class k |
| $\beta_k$ | Probability density function (pdf) vector for class k |
| $\theta_k$ | parameters for class k |
| $\Theta$ | Parameters for all classes |
| k | Class index |
| K | Number of classes |
| m | Data index |
| M | Number of rows in the matrix of basis function |
| n | Pixel data index (for element in a data vector) |
| N | Number of elements in a data vector x particularly, the number of pixel data points in a patch [e.g. N = 3P for RGB (3-point) data] |
| P | Number of pixels in a patch (e.g. P = 49 for a 7 × 7 RGB pixel patch) |
| p(s) | Probability density function |
| r | Index for pixel data types |
| R | Number of types of data for each pixel (e.g. R = 3 for RGB data) |
| $s_t$ | Source vector calculated for patch t during encoding process, its elements are termed "coefficients" |
| t | Data index for patches |
| T | Total number of vectors in the data set (e.g. the number of patches in an image) |
| $x_t$ | Vector of all pixel values in patch t (pixel vector) |
| X | Matrix of all pixel vectors for all patches in image: $X = [x_1, \ldots, x_t, \ldots, x_T]^T$ |
| $Z_{t,r}$ | Vector of pixel values z of type r for patch t |

Background of ICA

U.S. Pat. No. 5,706,402, by Anthony J. Bell, entitled "Blind Signal Processing System Employing Information Maximization to Recover Unknown Signals Through Unsupervised Minimization of Output Redundancy", issued on Jan. 6, 1998, discloses an unsupervised learning algorithm based on entropy maximization in a single-layer feedforward neural network. In the ICA algorithm disclosed by Bell, an unsupervised learning procedure is used to solve the blind signal processing problem by maximizing joint output entropy through gradient ascent to minimize mutual information in the outputs. In that learned process, a plurality of scaling weights and bias vectors are repeatedly adjusted to generate scaling and bias terms that are used to separate the sources.

Generally, ICA is a technique for finding a linear non-orthogonal coordinate system in multivariate data in which directions of the axes of the coordinate system are determined by the data's second- and higher-order statistics. ICA has been used in "blind signal separation" processes such as disclosed by Bell, in which the source signals are observed only as unknown linear mixtures of signals from multiple sensors, and the characteristic parameters of the source signals are unknown except that the sources are assumed to be independent. In other words, both the source signals and the way the signals are mixed is unknown. The goal of ICA in such applications is to learn the parameters and recover the independent sources (i.e., separate the independent sources) given only the unknown linear mixtures of the independent source signals as observed by the sensors. In contrast to correlation-based transformations such as principal component analysis (PCA), the ICA technique adapts a matrix to linearly transform the data and reduce the statistical dependencies of the source signals, attempting to make the source signals as independent as possible. Therefore each of the ICA basis function vectors are free to follow any direction suggested by the data rather than being constrained by algorithmic restraints; in other words, the relationship between ICA basis functions is not unrealistically limited by requirements such as the orthogonality requirement imposed by PCA techniques. As a result, the ICA basis functions are typically more efficient, and more accurately represent the data. ICA is a useful tool for finding structure in data, and has been successfully applied to processing real world data, including separating mixed speech signals and removing artifacts from EEG recordings.

ICA Process Description

ICA basis functions are utilized in the encoding techniques disclosed herein. Broadly speaking, ICA techniques can be used to develop, or "train", basis functions that characterize a wide variety of data sets, including images. U.S. patent Ser. No. 09/418,099, which is incorporated by reference herein, discloses ICA algorithms, including how ICA basis functions are trained, and discloses uses for ICA basis functions. Other references relating to ICA basis functions include T.-w. Lee, M. S. Lewicki and T. J. Sejnowski "Unsupervised Classification with Non-Gaussian Sources and Automatic Context Switching in Blind Signal Separation", IEEE Transactions on Pattern Analysis and Machine Intelligence, Vol. 22(10), 1078–1089, October 2000. ICA basis functions can be implemented using a variety of techniques and combinations. A single set of ICA basis functions can be used to characterize a set of data; however, for more accuracy and/or better efficiency, a mixture model can be used, as disclosed in U.S. patent Ser. No. 09/418,099, which is incorporated by reference herein, in which the dataset is classified in one of two or more classes. By selecting the class that most appropriately represents the data, characterization of data using multi-class ICA basis functions can be much more accurate and/or more efficient. More accuracy and/or greater efficiency can also be obtained by using ICA basis functions that implement a generalized Gaussian model in which each of the ICA basis functions has an associated variable (termed herein a "pdf variable") that designates the underlying statistical distribution as either sub-Gaussian, normal Gaussian, or super-Gaussian. This pdf variable may be continuously varying, which provides a wide range of distributions that can be modeled, thereby providing greater accuracy and/or greater efficiency. For example, ICA basis functions that implement a generalized Gaussian model are disclosed in PCT/US00/28453, filed Oct. 13, 2000, entitled "Unsupervised Adaptation and Classification of Multi-Source Data Using a Generalized Gaussian Model", which is incorporated by reference herein. The generalized Gaussian model can be used in both the single class and multi-class implementations of the ICA basis functions.

System Description

FIG. 1 is a diagram of an image 100 and devices for capturing the image, storing it, processing it, transmitting it, and receiving it. Particularly, the image 100 is scanned or captured by any suitable device, such as a scanner 105 in the case of an image on paper, or a digital camera 107. The digital camera 107 can includes any image-capturing device, such as a standard camera that captures visible digital images, satellite cameras that capture images of the earth or space in a wide range of wavelengths in digital form, and medical instruments that capture medical images such as medical resonance images (MRIs). Alternatively, other image data sources such as a video camera or a computer 110 that generates a computer-generated image can also be used to collect image data. The image data is supplied to a suitable processing device 120, which processes the data as appropriate. For example, if the image is not in a suitable digital format, the digital device 120 may translate it to a more suitable format. Examples of a suitable digital format include RGB. If the image data received by the digital device 120 is already in a suitable format then it may simply be passed through without format conversion.

The output image data from the digital device 120 is supplied to a computer 130, which then encodes and process the data as described elsewhere in detail herein. The encoded image may be displayed on the display monitor 135 on the computer and/or may be transmitted over a communication network 140. The communication network 140 may comprise one or more suitable networks, such as the Internet, a company's intranet, a local area network, or any suitable communication network for communicating between devices. The communication network allows communication with a variety of devices, such as a second computer 150, a printer 160, and other suitable devices 170. One example of a suitable device is a device complying with the Bluetooth standard, which provides a standard for connection to communication networks.

Generally, the algorithms described herein, whether they be for encoding, compression, decompression, transmission, and so forth are implemented in a suitable computational device such as a general purpose computer (shown in FIG. 1) or another device. However, they can also be implemented in a wide variety of devices, such as digital cameras, scanners, and display devices. An ASIC (Application Specific Integrated Circuit) may be used to implement the algorithm. The digital data can be stored in any computer memory or any fixed storage device, such as a hard disk or a CD-ROM. In other words, the image data collected and stored may reside in the memory of a computer or in any other suitable memory location accessible by the desired processing device.

Image Definition and Data

Figure 2:
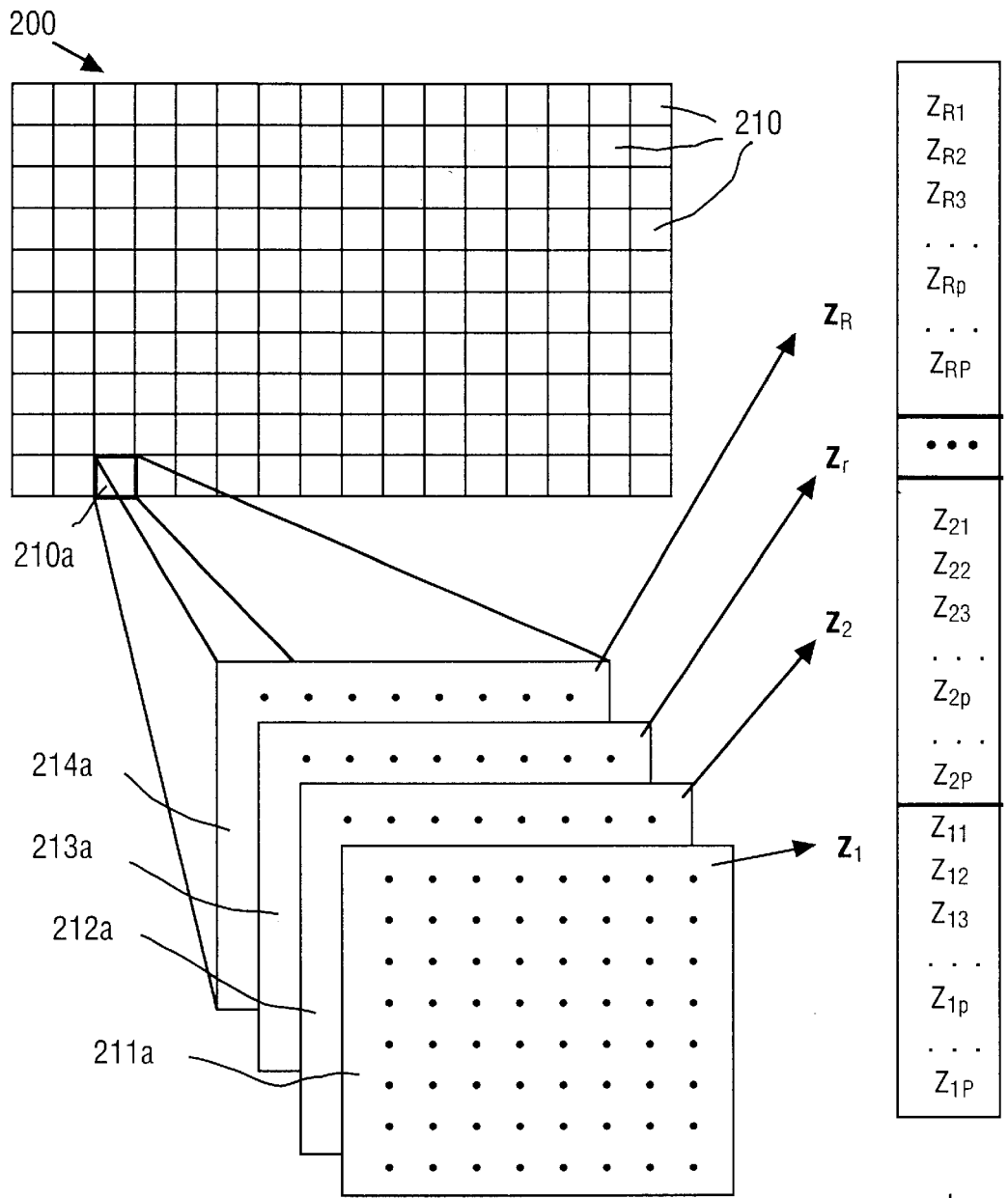
FIG. 2 is a diagram of an image divided into plurality of patches, illustrating a process in which the pixel values in each patch are transformed into a data vector.

FIG. 2 is a diagram of a digitized image 200 defined by a plurality of pixels arranged in rows and columns; one conventional format is 640×480; higher resolution formats include 832×624 and 1024×768, for example. The image 200 is divided into a grid configuration that has a number of different patches 210, each patch having a predefined pixel configuration. For example, each patch 210 may comprise an 8×8 array of pixels; however, other patch sizes can be used, such as 7×7 or even a non-square patch could be utilized to create patches in alternative embodiments.

Each pixel in the digitized image 200 has digital data associated therewith. Conventionally, digital data has the form of RGB (red, green, blue) data from each pixel. These three values specify the intensity of the particular color at a particular pixel. In other embodiments, alternative color spaces and alternative forms of digital data storage can be utilized; for example, black and white information, infrared information, luminance information and a variety of digital information can be associated with each pixel.

The basis functions in the compression system typically require the data to be defined in a predetermined color space equivalent to the color space in which the basis functions were trained; for example if the basis functions were trained in an RGB color space, then the data input should be RGB, or it should be converted to RGB from its native format. However, when this conversion is associated with loss of information, it is preferable to use the native data format rather than converting it. The color space in which the basis functions are trained can vary between embodiments; and it is preferable if the encoding is done directly on data represented in the color space for which the basis functions were trained, or using a transformation that accurately maps one color space to another. For example, if the color space is a linear transform of the input space, the resulting basis functions will be also linearly transformed. However, the transformation is much more difficult if nonlinearities exist between the two color spaces (such as from LMS to quantized RGB). Typically nonlinear transformations experience an information loss that could adversely affect the encoding. In summary, it is preferable if the encoding is done in the original color space of the data.

In order to illustrate the way in which a data vector for a patch is constructed from image data, an expanded view of a patch 210a is shown with the separate digital values associated with each pixel in the patch. In the illustrated embodiment, an 8×8 pixel grid is shown; however as discussed above other configurations could be utilized. The expanded version of the patch 210a shows a series of planes that represent one pixel value. Particularly plane 211a shows a first type of pixel values (for example, the red values for each pixel in the patch). These first values are collected together in a type vector $z_1$ whose elements are $z_{11}$, $z_{12}$, $z_{13}$, ... $z_{1P}$. For purposes of description each patch includes a total number of pixels P and the individual pixels are numbered 1 to P with the data index p. Furthermore, each pixel has one or more values (or data points) referenced by R, with data index r. For example, R=3 for RGB image data and a 7×7 patch would yield three type vectors ($z_1$, $z_2$, $z_3$) each having 47 elements.

A second plane 212a (r=2) shows the second values for all the pixels in a patch, these values are collected together into a second vector $z_2$. A third plane 213a represents additional pixel values that may be associated with each pixel, and these are collected into one or more data vectors $z_r$. Finally, at 214a, the last pixel value, (r=R) is collected into a vector $z_R$. The collected pixel vectors $z_1, z_2, \ldots z_R$ are concatenated to provide the data vector $x_t$ for this patch t. Again for purposes of description, a number of patches in an image is represented by t, so that each of the patches is represented by a number for t:t=1 to T. The first patch is represented by a first data vector $x_1$, and the final data vector is represented by $x_T = [x_1, x_2 \ldots x_n, \ldots, x_N]^T$. These data vectors for each patch from 1 to T are separately encoded, compressed, and then transmitted or stored, and then decoded as discussed in detail herein.

Encoding

Figure 3:
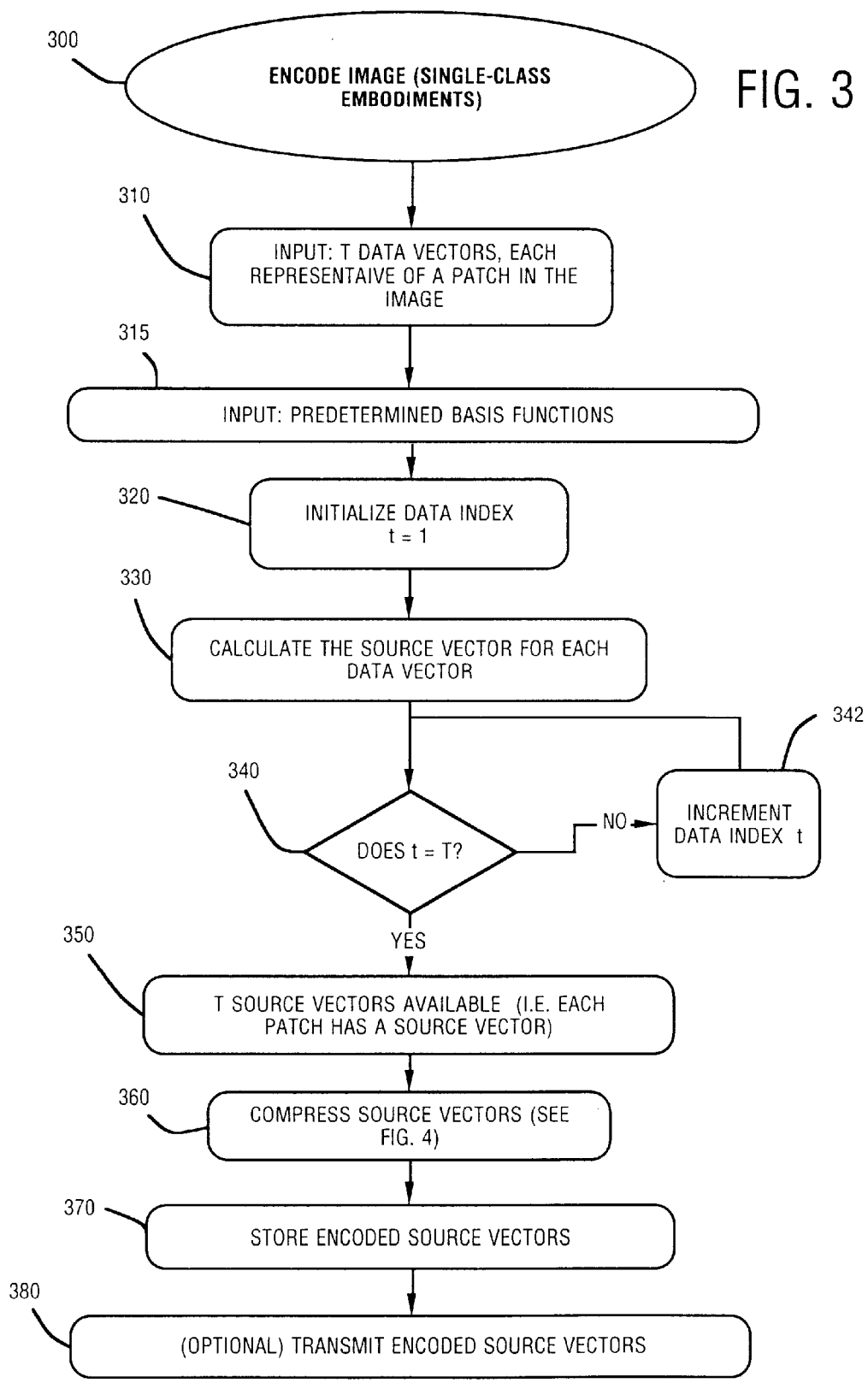
FIG. 3 is a flow chart of a method for encoding an image using a single class of basis functions.

Reference is now made to FIG. 3, which is a flow chart that illustrates encoding an image using a single class of basis functions. In order to facilitate description of the encoding method, a single class will first be discussed. For some uses, a single class of basis functions is adequate and appropriate; however, other uses may benefit from utilizing multiple classes, as discussed elsewhere such as with reference to FIGS. 9 and 10. Multi-class embodiments can advantageously improve encoding efficiency, and improve accuracy at the cost of more complexity and larger data files. It should be assumed that the basis functions disclosed and discussed herein are ICA basis functions.

In FIG. 3, at 300, the process of encoding an image using a single class begins by receiving T data vectors. Each data vector is a representative of each patch in the image. As discussed previously, in this embodiment the data vectors are provided by dividing the image into a grid of contiguous blocks, each having an equal patch size. In an alternative grid (e.g. a pixelized scheme), a series of overlapping patches could be defined, each block being separated by one (or more) pixels. Although the overlapped grid encoding may be more accurate, additional computational time will be required.

At 315 the basis functions for the single class are supplied. These basis functions have been previously computed (or trained) for the desired type of images as discussed elsewhere in more detail. Generally, for a single class, the class can be trained to provide an acceptable image quality for each of the expected classes. For multi-class classifications, each may be trained separately for greater accuracy. For example, natural scenes, pictures of people, city scenes, animals, and so forth are types of images that can be trained.

In this encoding method for a single class, a loop is used to encode each patch to provide a source vector. At 320, the data index is initialized to t=1 and the process begins. At 330, for the current patch the source vector is calculated using the following formula:

$$S_t = A^{-1} \cdot x_t$$

At boxes 340 and 342, the loop tests to determine if all patches have been encoded; if not the index is incremented and the calculation (at 330) is repeated. This loop continues until all patches have been encoded, and then operation moves to box 350 which indicates the source vectors are now available; in other words, each patch from 1 to T has a calculated source vector associated therewith. Next, at 360 the source vectors are compressed to provide final compressed source vectors. Compression is described below, for example. At 370 the compressed vectors are stored, and, as shown at 380 the encoded compressed source vectors may be transmitted.

In summary, in order to encode image data, the pixel data from each patch is multiplied by the inverse of the basis matrix to arrive at a source vector for each patch, which will have the same number of elements as the original data vector. For example, if the data vector corresponds to a 7×7 patch of RGB data (3 data points per pixel), then 147 elements would reside within the data vector, and the corresponding source vector would also have 147 elements. As will be described, in order to compress the image data, less than all these 147 elements will be stored and/or transmitted. It also may be noted that in this example, the number of columns in the basis matrix will also have 147 elements.

Compression: Overview

In order to compress the calculated source vectors, several different methods may be implemented; for example a "quantization of the coefficients" method could be utilized to develop an optimal quantizer for the sources, using the properties of the distributions of the source coefficients. Many compression methods, some of which are described in detail herein, operate upon the principle of selecting less than all the source values in a source vector. For example, if the source vectors each contain N coefficients and the pixel data vectors from which they were derived also contain N values then some of the source values must be omitted from the source vector in order to provide a significant advantage in compression. In other words, in order to conserve space and reduce transmission time, it is useful to omit some of the source values. The theoretical basis for omitting certain of the source values or "coefficients" relates to the nature of the basis functions described herein and the amount of sparseness that they provide. The compression and sparseness is discussed below in more detail; however, generally "sparseness" means that relative few of the coefficients have significant value while many coefficients are clustered very close to zero. Thereby, many of the coefficients contribute very little to the overall representation of the patch. In general there are a number of ways to select coefficients to omit, several of which will be described herein. One way is to omit predetermined coefficients; i.e. always select coefficients predetermined by their position in the vector. In such embodiments the number of calculations can be reduced because it is necessary only to calculate the coefficients that will be sent. The predetermined coefficients are selected by the trainer, or other expert, and their position within the source vector is known by the encoding and decoding algorithms. A second way to compress is to select a certain number of the coefficients with the largest values; for example, only the largest 20 coefficients in each source vector are sent. Still another compression technique is to select all coefficients that have a value above a certain threshold value.

Compression: Implementations

Described herein are at least two ways to select the coefficients to be stored/transmitted. The first way is by selecting predetermined coefficients, the other method is by coefficient selection based on certain characteristics of the data. The first way will be discussed first.

Figure 4:
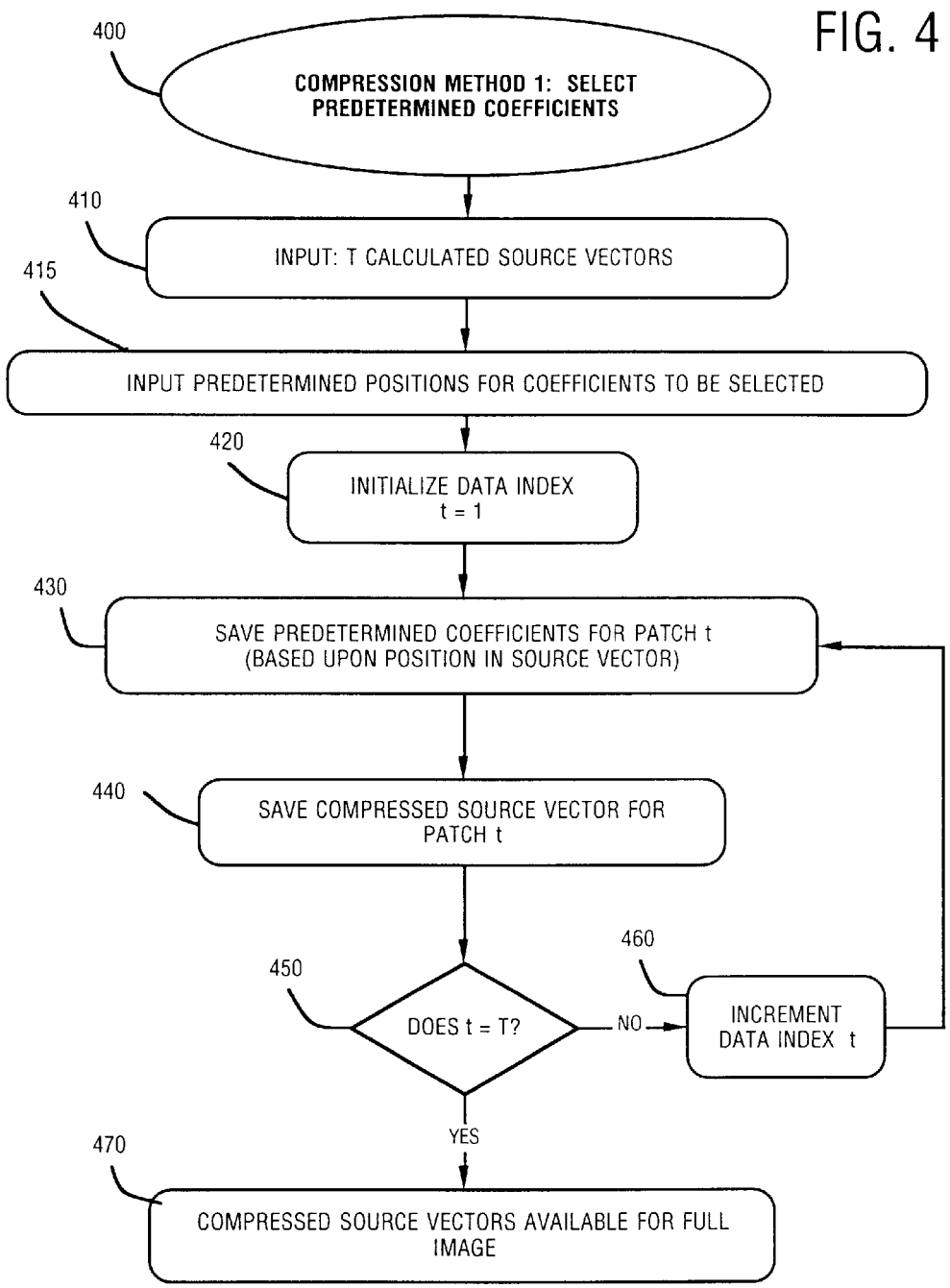
FIG. 4 is a flow chart of a first compression method in which predetermined coefficients are selected by position within the data vector.

Reference is now made to FIG. 4, which is a flow chart of compression using the predetermined coefficients method. Beginning at 400, the method begins. At 410 the calculated source vectors for an image are received. At 415, predetermined positions for the coefficients to be selected are input. These predetermined positions are determined by the trainer of the algorithm, or another expert who has determined in advance which of the coefficients are most likely to carry significant value. Often, by observing the source vectors for a large number of images, it is possible to determine which coefficient positions have the most significant values. Therefore, the coefficients at these particular positions can be saved and the other, non-significant coefficients can be safely ignored in many circumstances.

At 420 the data index is initialized to begin the loop. This loop, including the boxes 430, 440, 450, and 460, selects (by position) predetermined coefficients in each source vector. Particularly, at 430 the predetermined coefficients are selected for the patch t based solely upon their position in the source vector. For example, coefficients 1, 3, 10, 21, 25, 60, 70, 73, may be selected. Next, at 440, these coefficients are saved to represent the compressed source vector for the patch t. At 450 the index is tested to determine if the loop is complete; if not, the data index will be incremented, and the operations are repeated to select predetermined coefficients for the next source vector. When the loop is complete, at 470, the compressed source vectors are available for the full image; i.e. T encoded source vectors are now available.

Figure 5:
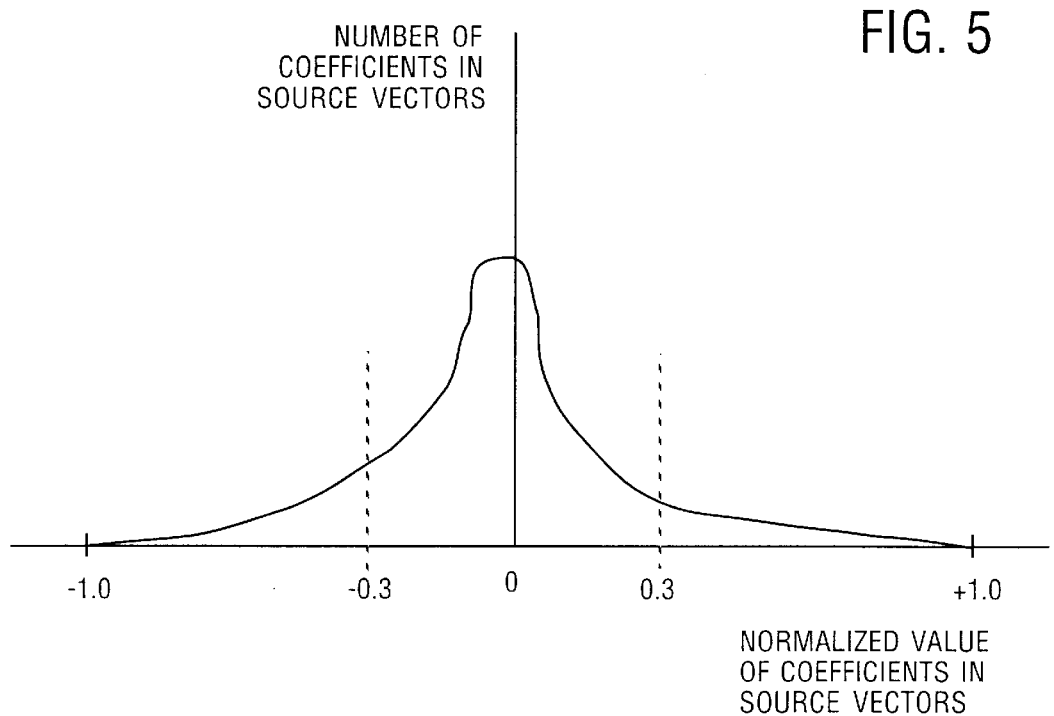
FIG. 5 is a graphical depiction of the distribution of the coefficients of the source vectors, showing the number of coefficients as a function of their normalized value, illustrating clustering of many of the coefficient's values around zero.

Reference is now made to FIG. 5. The second and third compression methods are based upon the observed coefficient values in each source vector for the image. In order to better explain this method, FIG. 5 is a graphical depiction of the clustering of the coefficients of the source vector around zero. Particularly, FIG. 5 is a graphical representation that depicts the normalized value of the coefficients of the source vectors on the x-axis. On the y-axis, FIG. 5 depicts the number of source coefficients that have a particular value. Typically, the values of the coefficients are normalized to one so that the central point of the x-axis is zero, and the coefficients extend from −1.00 to +1.00. As can be seen, the coefficients are highly clustered around zero, and many are less than a certain value. The degree to which the coefficients are clustered around zero determines the "sparseness" of the encoding algorithm. It is believed that the sparseness shown by the present algorithms is characteristic of a non-orthogonal basis function, such as ICA, which is trained to follow the characteristics of the data more closely than if they had been orthogonally constrained. The large number of coefficients clustered around zero provides the opportunity to more accurately compress the information. In other words, the compression methods to be described select particular coefficients that add the most significant value to the source vector, which permits the non-significant coefficients to be omitted without significant loss of data.

In order to determine which of these coefficients are most significant, the value selection method looks at each source vector and determines the coefficient elements that have the highest values and their relative positions in each source vector. One way of accomplishing this is for the algorithm to select the predetermined number (e.g. 30) of the highest coefficients in the source vector. The algorithm would proceed to select these 30 coefficients, and then store the value of the coefficients together with their position. Each patch in the image would be compressed in the same way, selecting the top 30 coefficients of the source vector and again storing the value of these coefficients and their position within the source vector.

Figure 6:
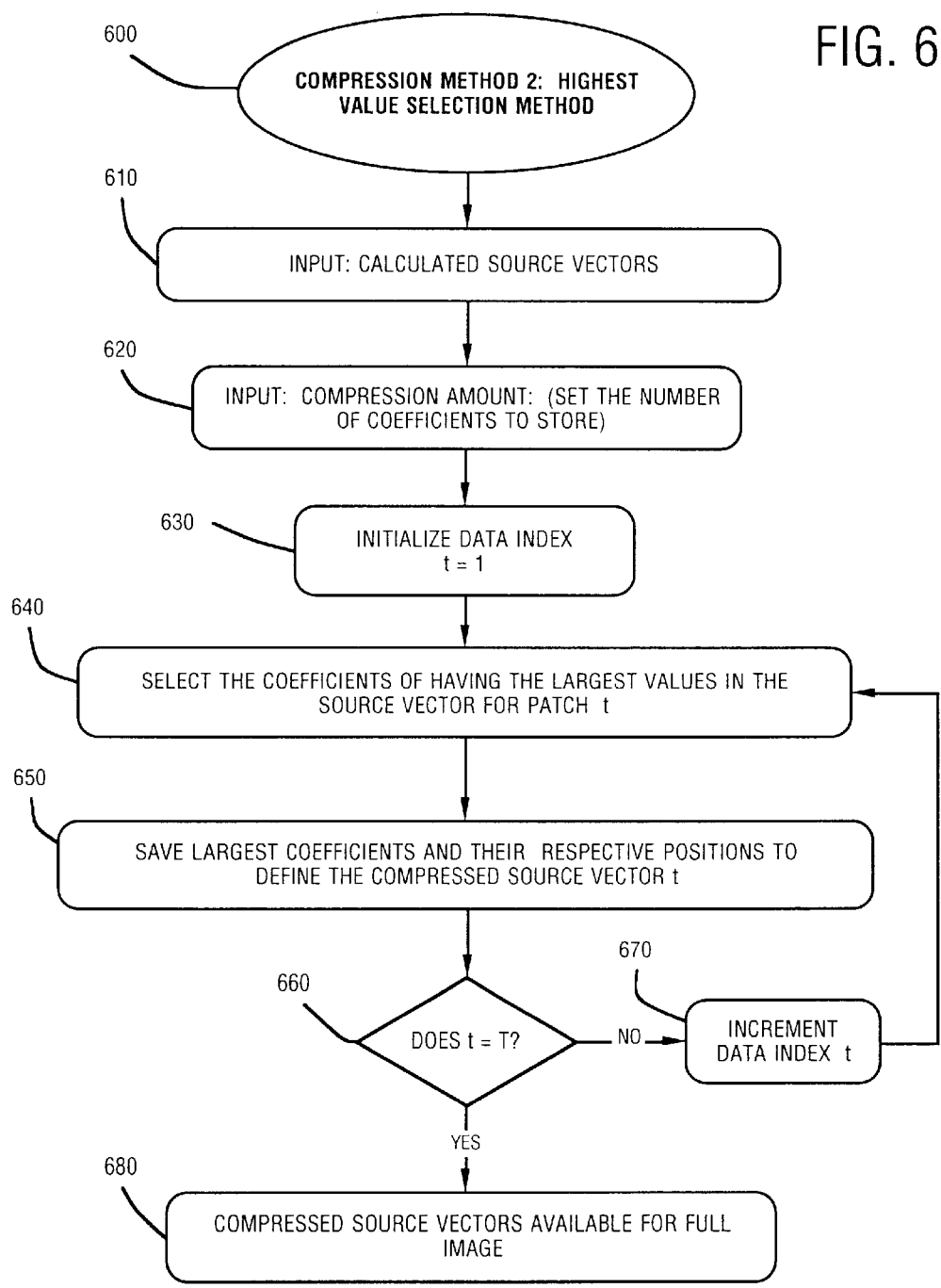
FIG. 6 is a flow chart of a second compression method in which a predetermined number of the coefficients with the largest values are selected by position within the data vector.

Reference is made to FIG. 6, which shows the "highest value selection" method beginning at 600. At 610, the calculated source vectors are input into the compression method. At 620 the compression amount is input, which determines the stored number of coefficients for each source vector. In some embodiments a compression amount may be predetermined or selected by the user, and in other embodiments the compression amount may be determined by other sources such as the trainer. In determining the compression amount, the number of coefficients to be stored are selected. In some embodiments, the number of coefficients could be defined by a range corresponding to the amount of data compression as determined appropriate by the trainer, for example, an amount between 5 and 20 may give high compression/low quality, an amount between 25 and 40 may give medium compression/medium image quality, and an amount between 47 and 70 may give high image quality/lower compression.

At step 630, the data index is initialized, and at 640 the coefficients for that source vector t are selected having the largest values corresponding to the number of coefficients input in 620 above. For example, if 30 coefficients are to be stored, then the largest 30 values are selected. Next, at 650 the largest coefficients and their respective positions are saved to define the compressed source vector for the patch t. Next, the loop repeats, as shown by the conditional statement 660 and the increment step 670 for each of the source vectors in the image. When all patches have been compressed, then as illustrated at 680 the compressed source vectors are now available for the full image.

Figure 7:
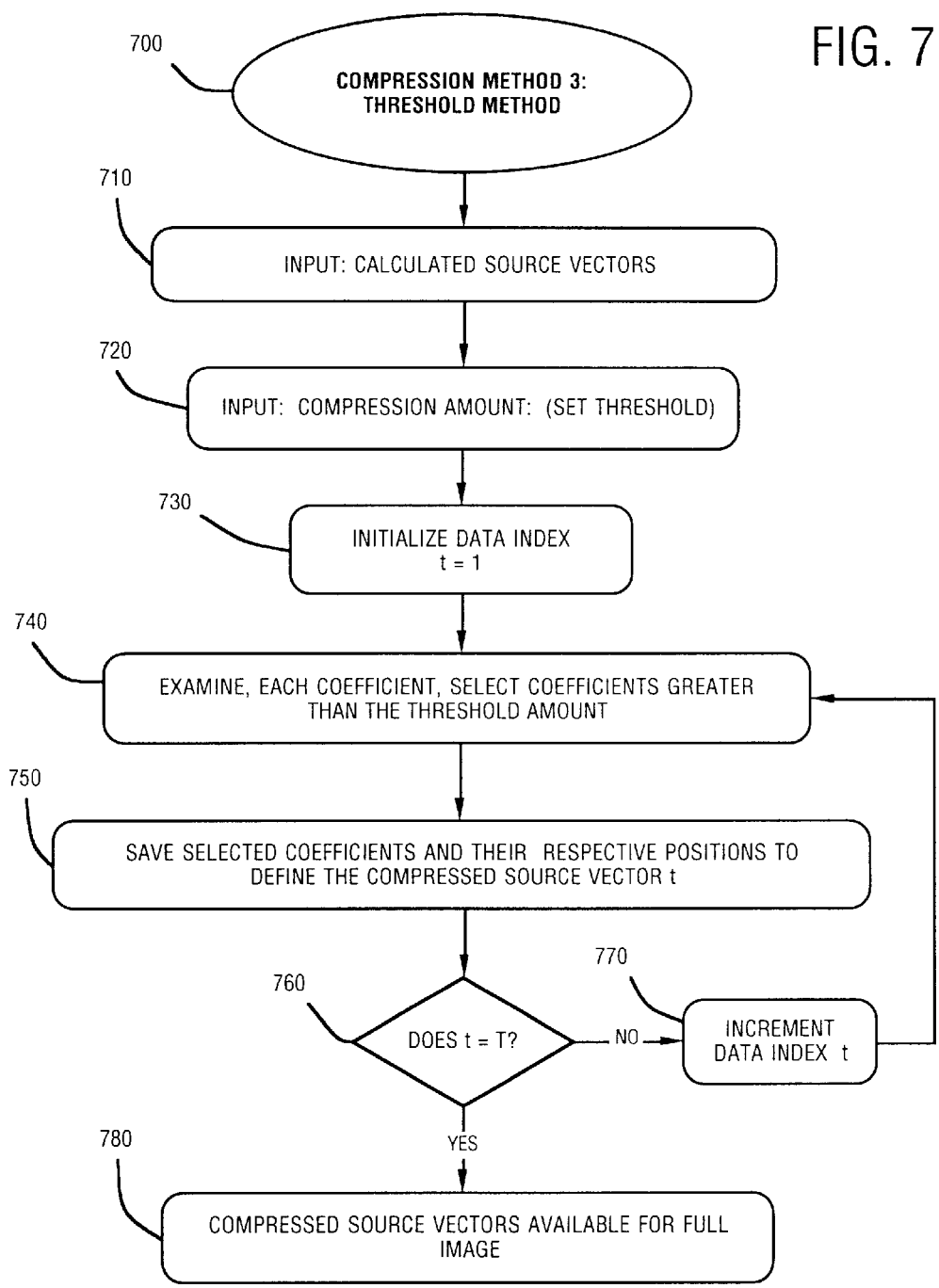
FIG. 7 is a flow chart of a third compression method in which coefficients are selected if greater than a predetermined threshold value.

Reference is now made to FIG. 7, which is a flow chart that illustrates compression using the threshold method, in which the coefficients for each source vector are selected dependent upon their contribution (value) to the image. At 700 operation begins, and at 710, the calculated source vectors for the image are input. At 720, the compression amount is selected; in other words, the threshold value is selected. The actual threshold value may be determined in any number of ways; for example, the threshold may be a fixed amount as determined by the trainer or other expert. The threshold compression amount may be predetermined or selected by the user. Several different ranges of values may be selected to provide varying levels of compression versus image quality. The user may be able to select an acceptable threshold to determine the amount of compression; for example, a threshold of 0.15 (normalized) may provide high accuracy but low compression, whereas a threshold of 0.5 (normalized) would provide high compression/low accuracy.

The input including the calculated source vectors from box 710 and the compression amount from box 720 is supplied to a loop that begins at 730 in which the data index is initialized, and then at 740 each coefficient is examined and selected if greater than the threshold amount. This operation can be performed, for example, in a loop that receives each coefficient, saves it in its position if greater than the threshold amount and repeats for each succeeding coefficient to include all coefficients in the source vector. At 750, the compressed source vector t is now complete, and the selected coefficients in their respective positions are saved to define the compressed source vector t. One difference between this algorithm and the algorithm shown in FIG. 6 is that the number of coefficients is not fixed, and therefore, the number of coefficients may vary from patch to patch in a manner determined by the image data in each patch. At 760, the loop tests to determine if all source vectors have been processed, if not, at 770 the data index is incremented and operation returns to box 740 where in each coefficient in the next source vector t+1 is examined. However, if at 760 all source vectors have been processed (i.e. t=T), then at 780, the compressed source vectors are now available for the full image.

Figure 8:
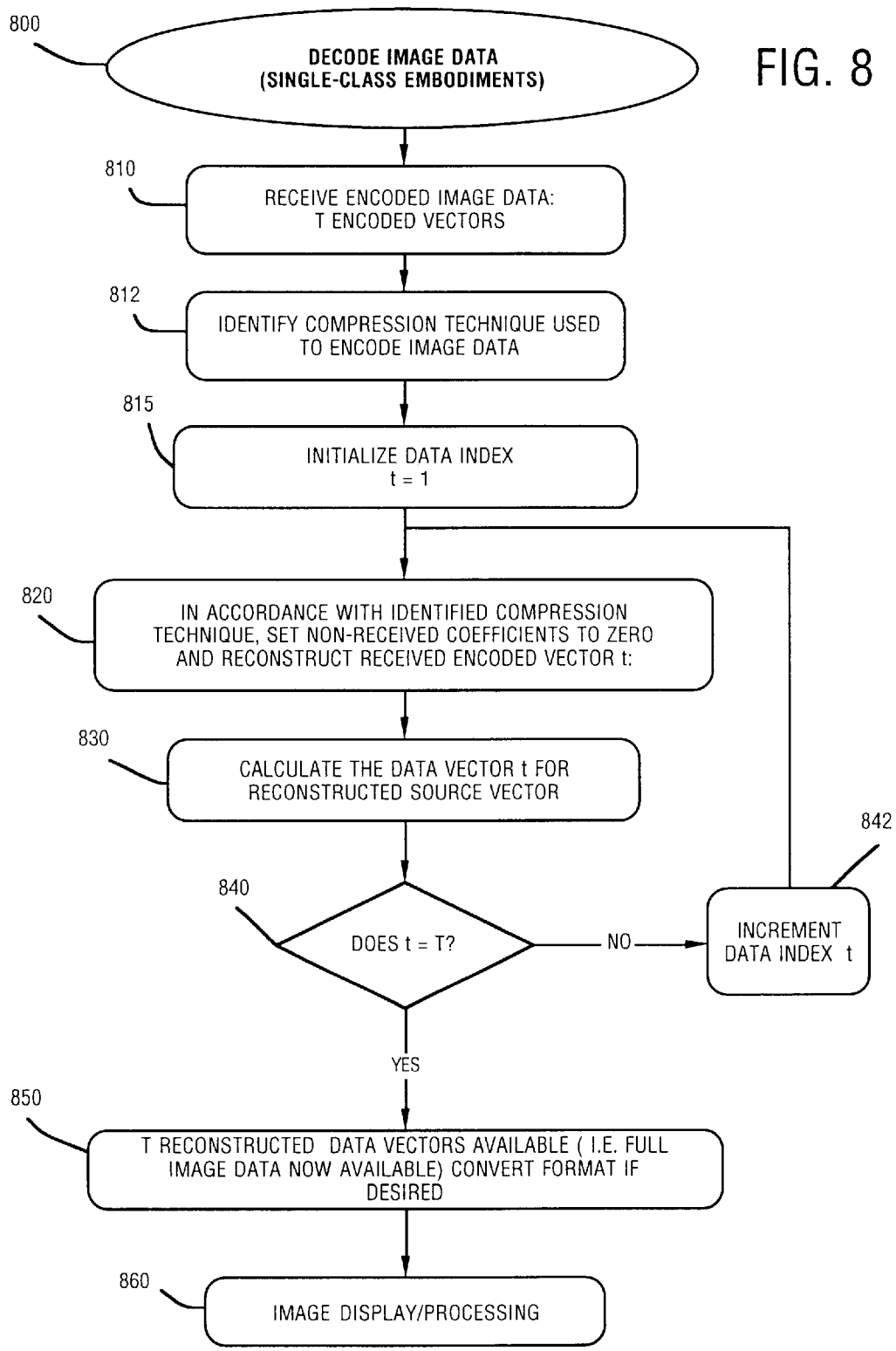
FIG. 8 is a flow chart of a method for decoding previously-encoded image data using a single class of basis functions.

Reference is now made to FIG. 8, which is a flow chart of decoding image data for a single class encoding/decoding configuration. At 800 the process begins, and at 810 the encoded compressed image data is received, including T encoded vectors. This image data may be received in a variety of ways, such as over a network such as the Internet, by magnetic media storage such as a hard disk, an optical device such as a CD, or any other computer storage or transmission media.

At 812, the compression technique that was used to encode the image is identified; for example, the method is identified to be one of the predetermined coefficients method (FIG. 4), the highest value selection method (FIG. 6), and the threshold method (FIG. 7). The identification mechanism is provided by any suitable means, for example, the image data itself may include a compression identifier field that uniquely designates the compression method used. Dependent upon the compression method selected, additional information may be received, such as the number of coefficients and/or their positions within the source vector.

At 815, the loop begins to decode each of the encoded vectors received. Particularly, at 815 the data index is initialized. At 820, the first received encoded vector is reconstructed to provide a reconstructed source vector $s_t^*$, so that it can be used in the algorithm. Particularly, the non-received coefficients are set to zero in order to provide a reconstructed source vector $s_t^*$ having the same number of elements as the original source vector. This is a predetermined quantity; for example, if a source vector has 49 elements, and only 20 have been sent, then the remaining 29 positions of the reconstructed source vector are filled with zeros in order to reconstruct the source vector $s_t^*$.

At 830, the data vector $x_t$ is calculated using the reconstructed source vector by a matrix multiplication between the reconstructed source vector $s_t^*$ and the basis matrix A. Particularly:

$$x_t = A \cdot s_t.$$

After the reconstructed data vector has been calculated, then the operation is repeated for each of the received encoded vectors in the image. Particularly, as shown in FIG. 8, at 840 a test is performed to determine whether all encoded vectors have been processed and if not, then the data index is incremented at 842, then the next encoded vector is reconstructed and the corresponding data vector is calculated for that reconstructed source vector. Once all encoded vectors have been utilized to create corresponding data vectors, then operation exits from 840 and goes to box 850, where the T decoded data vectors are now available. If format conversion is necessary or desirable at box 850 to meet color space or other requirements, the format of the decoded data vectors is converted; for example, if the data vectors have an LMS format but an RGB format is desired, then an appropriate conversion is performed to convert the data vectors to the desired format. At 850, the full image data is now available. Next, at 860, the decoded data vectors are used to create an image on a display and/or further processing as may be necessary or desirable.

Multi-Class Embodiments

Figure 9:
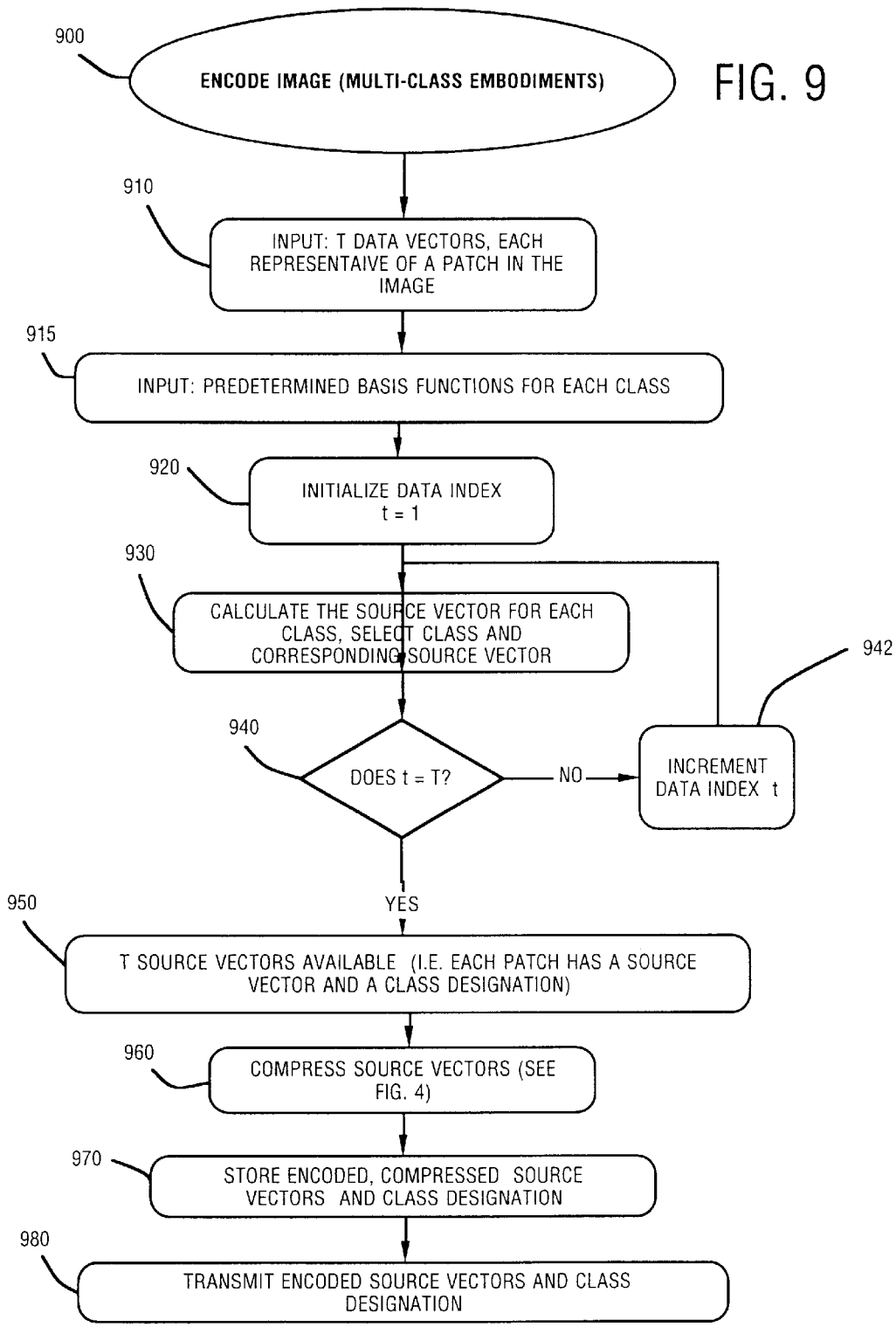
FIG. 9 is a flow chart of a method for encoding an image using multiple classes of basis functions, so that each patch is encoded with one of the multiple classes.
Figure 10:
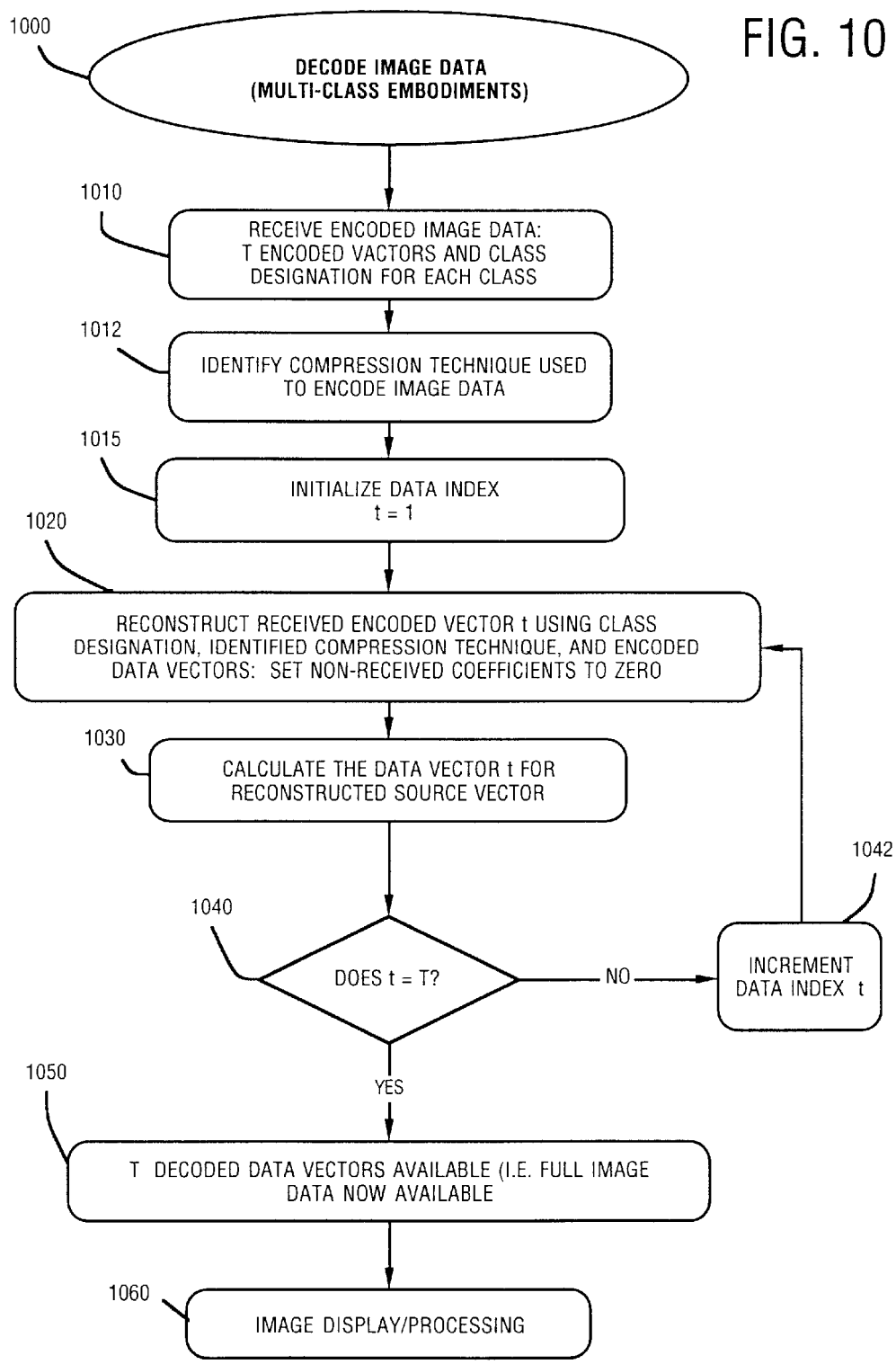
FIG. 10 is flow chart of a method for decoding an image that has been encoded using multiple classes of basis functions.

Reference is now made to FIGS. 9 and 10 to illustrate multi-class embodiments, in which multiple classes of basis functions are utilized in order to better fit the source vectors to the data. Particularly, the multi-class embodiments allow a patch to be encoded using the most appropriate class of basis functions. Which class of basis functions is selected is determined by an appropriate rule, for example a maximum likelihood function such as specified in U.S. patent application Ser. No. 09/418,099. By encoding the source vector utilizing a most appropriate basis function, better encoding can be provided, more efficiently.

FIG. 9 is a flow chart that illustrates encoding an image using multiple classes of basis functions. Multi-class embodiments can advantageously provide greater accuracy at the cost of greater complexity in larger data files then a single class encoding. In FIG. 9, encoding an image in a multi-class embodiment begins by receiving t data vectors, each representative of a patch in the image. As discussed elsewhere, the patches are provided by dividing up an image into a grid of contiguous blocks, each having a predetermined patch size. In alternative grids, a series of overlapping patches can be defined, or a wavelength approach could be utilized, as described elsewhere.

At 915, the basis functions for each of the classes are supplied. These basis functions have been previously computed or trained for each class. Particularly, each class is trained separately for the different types of images that may be expected. For example, different classes may be trained for natural scenes, pictures of people, city scenes, animals, and so forth.

A loop is used to illustrate that each patch is encoded to provide an encoded source vector. At 920, the data index is initialized to t=1 and the process begins. At 930, the source vectors for each class are calculated using the respective basis functions to provide a plurality of source vectors, one for each class. A determination is made as to which of the classes is most likely, and the source vector corresponding to the most likely class is selected.

At boxes 940 and 942, the loop performs a test to determine if all patches in the image have been encoded; if not the index is incremented and the calculation of the source vectors for each class at 930 is repeated. The loop through the boxes 940, 942, and 930 is repeated until all patches have been encoded, and then operation moves to box 950, which indicates that all of the source vectors (T vectors) are now available. In other words, each patch from 1 through T now has a calculated source vector associated therewith together with a class designation. Next, at 960 the source vectors are compressed in any suitable manner as described elsewhere herein, to provide final, compressed source vectors. At 970, the encoded compressed source vectors are stored and as shown at 980 the compressed source vectors may then be transmitted.

FIG. 10 is a flow chart that illustrates the decoding image data for a multi-class embodiment. At 1000, the process begins, and at 1010, the encoded, compressed image data is received including T encoded, compressed vectors. This image data may be received from a variety of sources and over a variety of transmission media, such as over a network such as the internet by magnetic media storage, such as a hard disk, an optical device such as a CD, or any other computer storage or transmission media. At 1012, the compression technique is identified (e.g. the predetermined coefficients method, the highest value selection method, and the threshold method). At 1015, the loop is initialized in order to decode each of the encoded vectors received, and particularly to begin the decoding process. Particularly, at 1015 the data index is initialized. At 1020, the first received encoded vector is reconstructed to provide a reconstructed source vector that can be used in the algorithm. In order to reconstruct a source vector, the identified compression technique is used to determine which of the coefficients have been omitted due to compression. The omitted coefficients are set to zero, thereby providing a reconstructed source vector having the same number of elements as the original source vector. This is a predetermined quantity; for example, if a source vector originally has 49 elements and only 20 have been sent due to compression, then the remaining 29 positions are filled with zeros in order to reconstruct the source vector.

At 1030, the data vector is calculated using the reconstructed source vector by a matrix multiplication between the reconstructed source vector and the basis matrix specified by the class designation.

After the reconstructed data vector has been calculated, then the loop repeats operation for each of the received encoded vectors in the image. Particularly, as shown in FIG. 10 at 1040 a test is performed to determine whether all encoded vectors have been processed and if not, then the data index is incremented at 1042, then the next encoded vector is reconstructed and the corresponding data vector is calculated for that reconstructed source vector. Once all encoded vectors have been utilized to create corresponding data vectors, then operation exits from the loop at 1040, and goes to 1050, which indicates that the T decoded data vectors are now available; in other words, the full image data is now available. Finally, at 1060, the decoded data vectors are now available to directly create an image on a display and/or utilized for further processing which may be necessary or desirable. For example, it may be necessary to convert the color space of the decoded data to an appropriate format, such as converting LMS data to CMY data for printing or converting from LMS to RGB for viewing on a monitor.

Encoding Using Wavelet Approach

Figure 11:
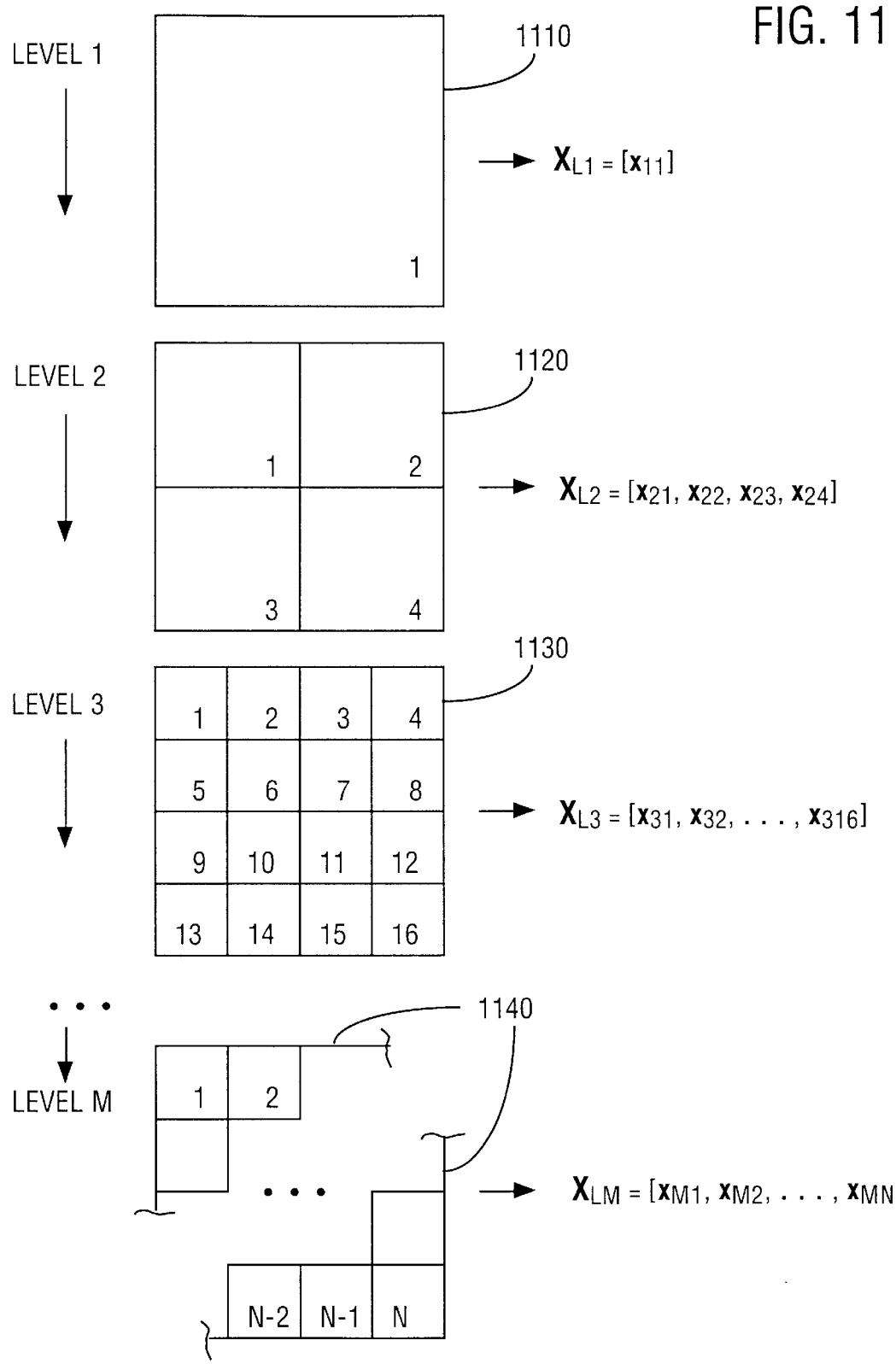
FIG. 11 is a diagram that illustrates the wavelet approach to encoding, in which the patches are progressively subdivided into smaller and smaller patch sizes.
Figure 12:
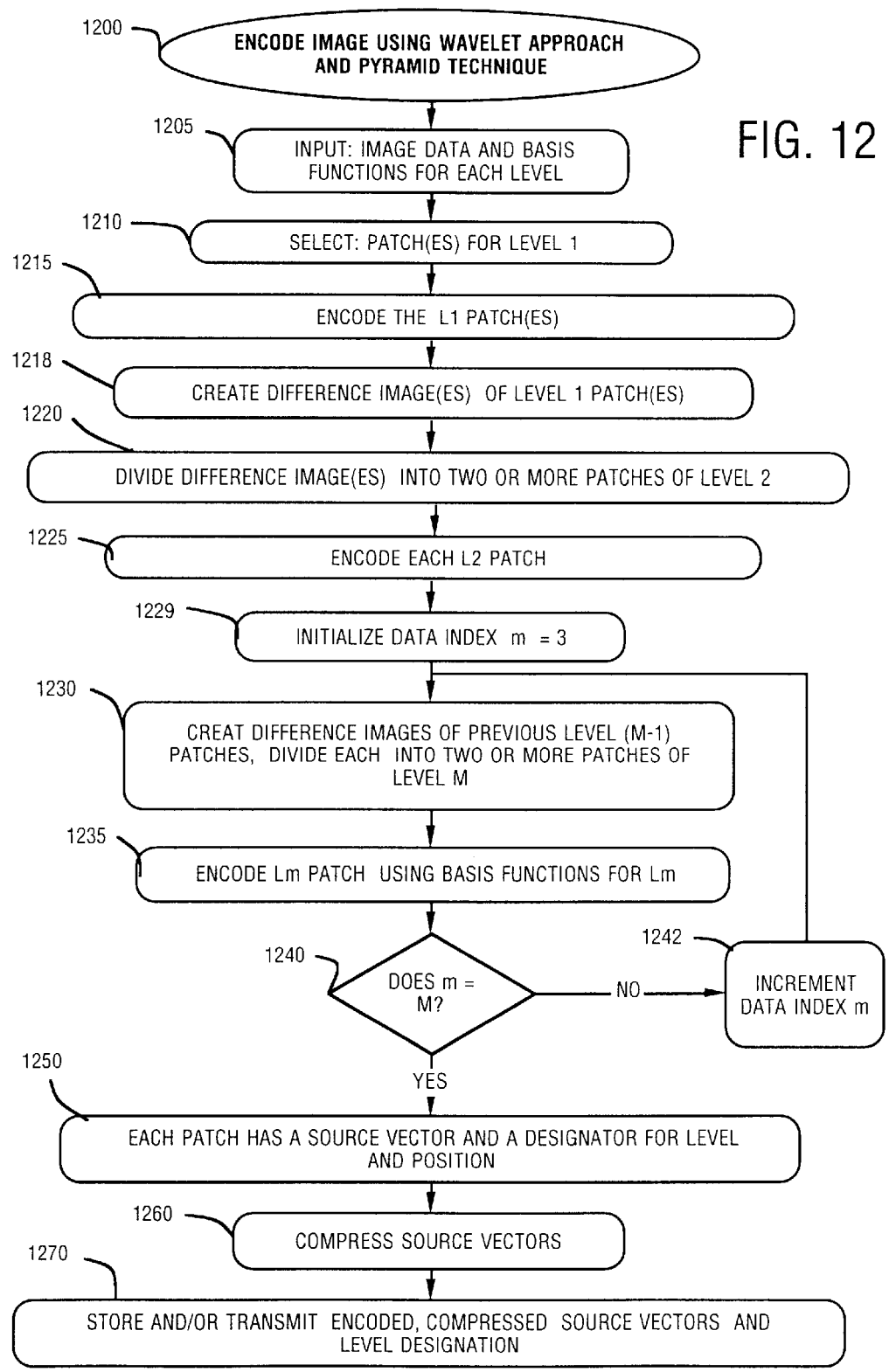
FIG. 12 is a flow chart that illustrates operations to encode an image using the wavelet approach.
Figure 13:
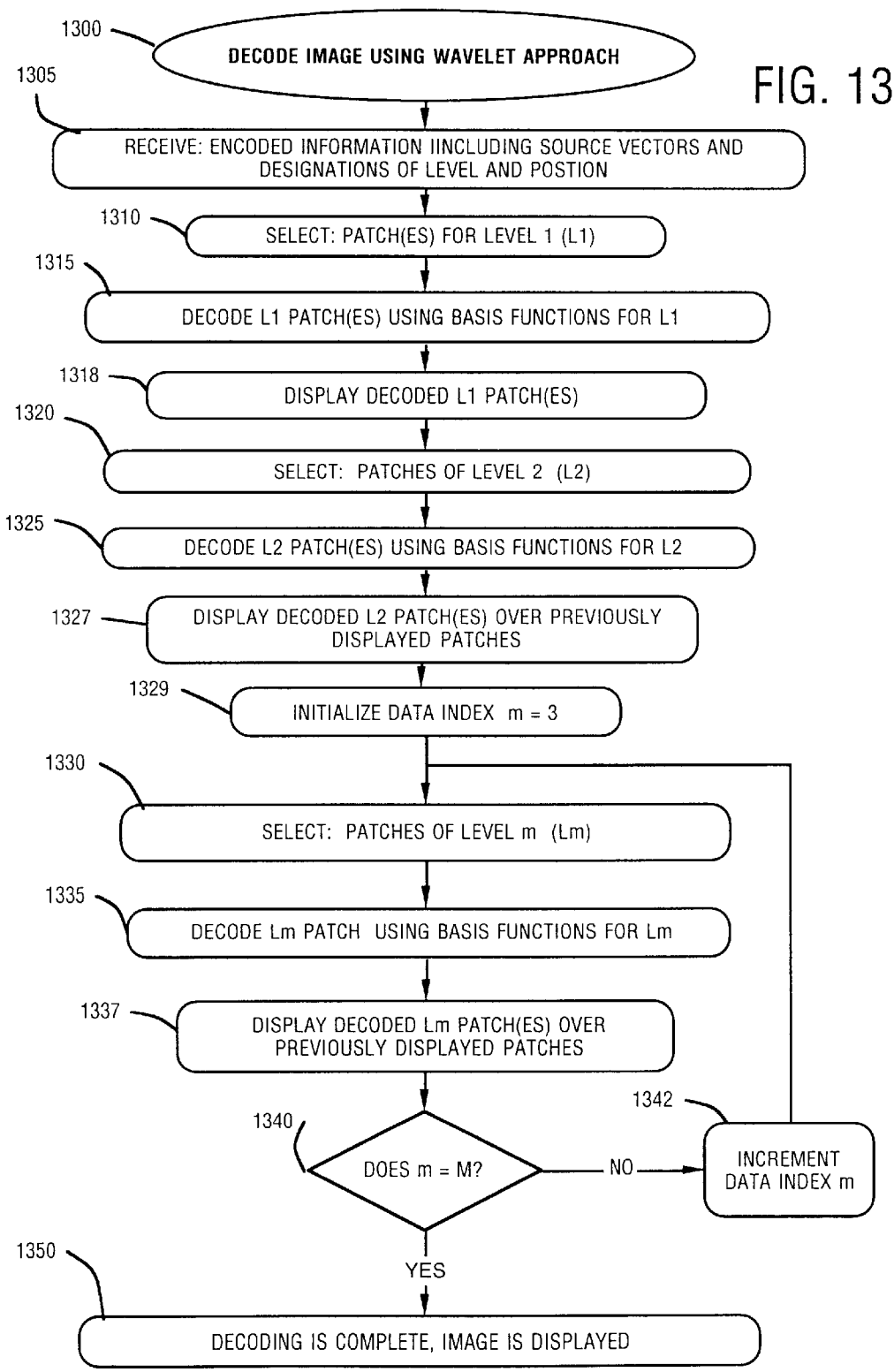
FIG. 13 is a flow chart that illustrates decoding an image that has been encoded using the wavelet approach.

FIGS. 11, 12, and 13 illustrate a system in which the wavelet approach is employed in order to encode and decode the data. Wavelet approaches to image data compression are known; for example, the proposed JPEG 2000 standard utilizes a wavelet approach. Herein, the wavelet approach is utilized together with ICA basis functions and/or multi-class basis functions as described with reference to paragraphs 9–10, and/or the generalized Gaussian basis functions, in order to provide an efficient and accurate encoding and decoding method.

FIG. 11 is a diagram that illustrates operation of the wavelet approach, particularly, illustrating the progression in which the patches are selected. Generally, the wavelet approach processes and encodes the image data at each of a plurality of levels, each level having progressively smaller image patches. Using a pyramid technique in conjunction with the wavelet approach, the image at each subsequent level is defined by taking the difference between the patch at that level and the source vector calculated from that patch, as will be described in the following example. Advantageously, the pyramid approach reduces the energy in the image based upon previously encoded image characteristics, thereby allowing more efficient encoding at each subsequent level. However, in alternative embodiments the pyramid technique may be modified or even omitted; for example, processing methods other than creating the difference image may be used, or difference processing may be omitted entirely.

As shown in FIG. 11 at 1110, a first image patch (Level 1) includes a substantial portion of the image. Typically the first image patch includes the entire image; however in alternative embodiments the first image patch could be a subdivision of the entire image. A single data vector is defined by all the pixels in the first level image patch. To create the Level 2 patch as shown at 1120, the first level patch 1110 is processed including dividing it into four equal squares, each square providing a separate data vector x. In the pyramid technique to wavelet encoding, the first level patch processing includes taking the difference image between the first level patch and the source vector calculated from that patch. The second level patch is provided by subdividing the difference image.

As will be described, each level has its own set of basis functions that are utilized to encode the data vector(s). Typically, the large patches (e.g. Level 1) are encoded with basis functions that encode low frequency features, and as the patch size becomes progressively smaller, the subdivided, smaller patches are encoded with basis functions that encode progressively higher frequency features.

The Level 3 patches, shown at 1130, are provided by processing that includes subdividing each of the Level 2 patches into four equal squares, each square providing a data vector. In the pyramid technique, each of the second level patches are processed by taking the difference image between the second level patch and the source vector calculated from that patch. The difference image is then subdivided. The vectors define the data within each patch, and are arranged in any suitable manner, such as disclosed previously with respect to FIG. 2, for example.

After Level 3, there may be a number of additional levels. At each Level, the patches from the previous levels are processed and subdivided, providing a number of vectors equal to the number of patches until, at Level M, operation is complete. At Level M, the original first level patch 1110 has been divided up into N patches, as shown at 1140, and there are N corresponding data vectors.

Reference is now made to FIG. 12, which is a flow chart illustrating operations to encode an image using the wavelet approach that utilizes a pyramid technique. Operation begins at 1200, and then at 1205, an input is received that includes image data and the basis functions from each level from to Level M. At 1210, operation begins by selecting the patch for Level 1. In many embodiments, the entire image may comprise the first patch; however, in other embodiments a large subsection of the image may be utilized for Level 1. For example, the image may be divided into two or three, or more patches in order to provide the Level 1 patch.

At 1215, the Level 1 patches are encoded using the basis functions specific to Level 1, which typically encode low frequency features to provide a source vector. At 1218, the Level 1 patch and the source vector are used to create a difference image; in one embodiment, the highest value coefficient of the source vector is selected, and then used with its corresponding basis function to create an image patch which is subtracted from the Level 1 patch. At 1220, the difference patch(es) of Level 1 is subdivided into two or more patches to provide the Level 2 patches. At 1225, the Level 2 patches are encoded using the basis functions specific to Level 2, which typically encode higher frequency features than the Level 1 basis functions.

This process, in which the previous level's patches are subdivided, and then the new patches are encoded is repeated as illustrated in the loop including boxes 1229, 1230, 1235, 1240, and 1242. Particularly, at 1229, the level index is initialized to m=3, which corresponds to Level 3. At 1230, a difference image is calculated for each of the Level m−1 patches by subtracting each patch from an image patch calculated from the source vector (such as the highest coefficient). The difference patches are then divided into two or more patches to provide the new patches for level m. At 1235, each of the patches is encoded using basis functions particular to that level m. Typically, each level's basis functions encode higher frequency features than the basis functions for the previous level. The decision box 1240 assures that the loop will be repeated, and at 1242 the level index will continue to be incremented in each loop, until all levels have been completed.

After the encoding process has been completed, then as shown at 1250, the encoded image information is available; in other words, each patch has a source vector and accompanying information that designates level and position of the source vector.

Next, as shown at 1260 the source vectors are compressed using any suitable technique, such as disclosed herein in FIGS. 4, 5, 6, and 7. Finally, at 1270, the encoded compressed source vectors and the level designations and any other appropriate information are stored and/or transmitted to a remote location or used in any desired manner.

Reference is now made to FIG. 13, which is a flow chart that illustrates operations to decode an image using the wavelet approach. Operation begins at 1300, and then at 1305, the encoded information is received, including the source vectors, level designations, and position of the source vectors within each level. At 1310, the first level (Level 1) patches are selected. At 1310, the Level 1 patches are decoded using the specific basis functions for level 1.

At 1318, the decoded Level 1 patches may be displayed. The decoded Level 1 patch provides an approximate estimate of the final image; however, the viewer may wish to see each level as it is processed. In other embodiments, it may be preferable to delay displaying the image until all levels have been decoded.

At 1320, the second level patches are selected and at 1325, the second level patches are decoded using the specified basis functions for the second level. At 1327, the second level, decoded patches are displayed over the previously displayed patches from Level 1.

The operations for decoding are then repeated until all levels have been decoded as shown in the loop including boxes 1330, 1335, 1337, 1340, and 1342.

At 1330, the next level of patches selected, and at 1335 these patches are decoded using the basis functions for that level. At 1337, the decoded patches are displayed and at 1340 the level number is tested to determine if the operations is complete. If not, the data index m is incremented, as shown in 32 and the operation returns through the loop. After all levels have been decoded, then the image is displayed, as shown at 1350, and operation is complete.

Figure 14:
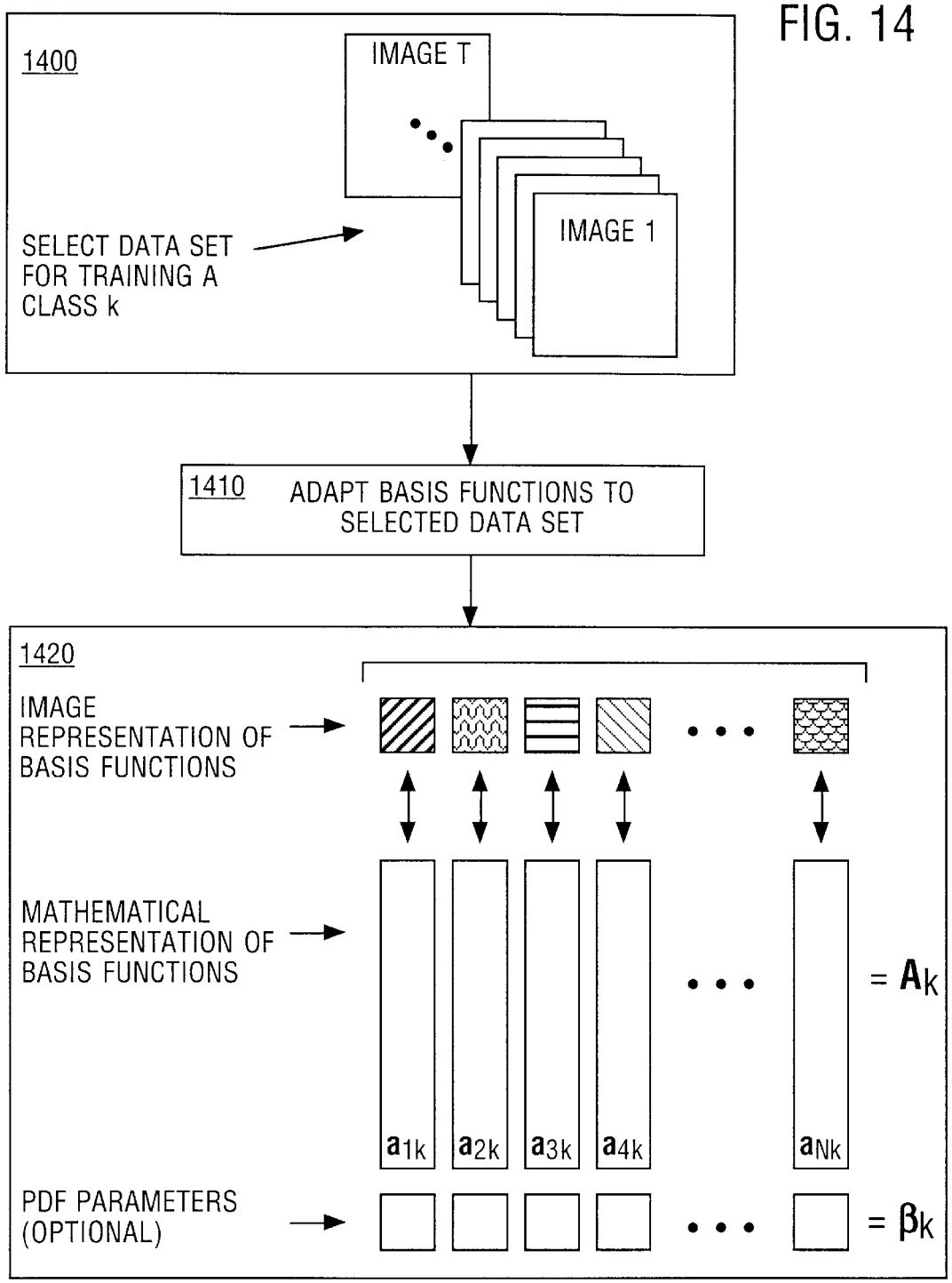
FIG. 14 is a diagram illustrating the process of adapting the basis functions.

FIG. 14 is a diagram illustrating operations to train, or "adapt" basis functions to represent image data. As shown beginning at 1400, an appropriate data set is first selected for training the basis functions for a class k. The data set may include many patches of images (e.g. 100,000 to a million or more). The data set should be chosen by one skilled in adapting basis functions to appropriately represent the images to be encoded. For example if a wide variety of images is to be encoded, then the data set should included an assortment of image patches generally representative of the wide variety of images. However, more efficient encoding is possible if the images in the data set are chosen to be closely representative of the type of image normally expected. For example, if portraits of people are the expected images, then the data set preferably includes a large number of patches taken from a diverse collection of portraits.

The diagram of FIG. 14 illustrates training a single-class whose index is designated by the index k, for convenience of reference. In multiple class embodiments as discussed elsewhere such as with reference to FIGS. 9 and 10, the training process may be repeated to provide a set of basis functions for each of multiple classes from 1 to K. Multi-class embodiments advantageously allow training of basis functions directed to particular types of images. For example, class 1 may be trained for people, class 2 may be trained for vegetation, class 3 may be trained for scenery, class 4 may be trained for buildings, and so forth. When encoding and decoding a patch, selection of the appropriate class allows a much more accurate and efficient representation of that patch by the selected class basis functions.

In embodiments that implement the wavelet approach, such as disclosed with reference to FIGS. 11, 12, and 13, each different level will require a different set of basis functions. For example, the basis functions for the first level (the largest patch) may be trained (or processed) to select the low frequency spatial components (i.e. the features that are constant or slowly changing across the image). The basis functions for the second level may be trained to select somewhat higher frequency spatial components (i.e. the features that are more rapidly changing across the image). Similarly the basis functions for each succeeding level (smaller and smaller patches) may be trained to select increasingly higher frequency spatial components.

As shown at 1410, the basis functions are adapted to the data using ICA techniques to provide adapted basis functions, using techniques such as disclosed in U.S. patent application Ser. No. 09/418,099, filed Oct. 14, 1999 entitled "Unsupervised Adaptation and Classification of Multiple Classes and Sources in Blind Signal Separation", which has been incorporated by reference herein. Generally, in this process, the parameters (e.g. basis matrix, pdf parameters, and so forth) are initialized, and then the parameters are adapted for each data vector in a main adaptation loop. Then, the main adaptation loop is repeated a plurality of iterations while observing a learning rate at each subsequent iteration. Any suitable learning rule can be used, for example gradient ascent, or maximum posterior value. When the learning rate slows after a number of iterations, eventually the basis matrix will be determined to "converge". After the learning rate has converged, then the basis functions have been trained.

The trained basis functions are illustrated at 1420 in two forms: 1) an image representation and 2) a mathematical representation. The image representation shows a series of patterns, each representing features that are commonly found in the images of the data set. In this context, each coefficient in an encoded image represents the weight given to the pattern associated with that coefficient.

The mathematical representation includes a column vector for each basis function. Together, the column vectors define the mixing matrix A for class k. Additionally, a pdf (probability density function) parameter may be associated with each basis function. The pdf parameter indicates the pdf associated with the basis function. In one embodiment, the pdf parameter includes a value that indicates whether the pdf is sub-Gaussian, Gaussian, or super-Gaussian. For example, a value of "1" may indicate a Gaussian pdf, values less than "1" indicate sub-Gaussian, and values greater than "1" indicate a super-Gaussian pdf. Taken together, the pdf parameters define a pdf vector $\beta$ for the class k.

ICA Basis Functions and Orthogonality

As shown in FIG. 14 and discussed with reference thereto, each basis function can be represented in the form of a vector in a multi-dimensional space that has at least two directions: i.e. each vector has at least two elements, and often many more. Each basis function is unique within the set of basis functions, and each vector can be depicted graphically. As will be shown, ICA basis functions are more efficient than other basis functions such as those derived using Principal Component Analysis (PCA), which are similar to those used by JPEG. For purposes herein, the PCA basis functions are considered substantially equivalent to the widely-used JPEG basis functions.

Figure 15:
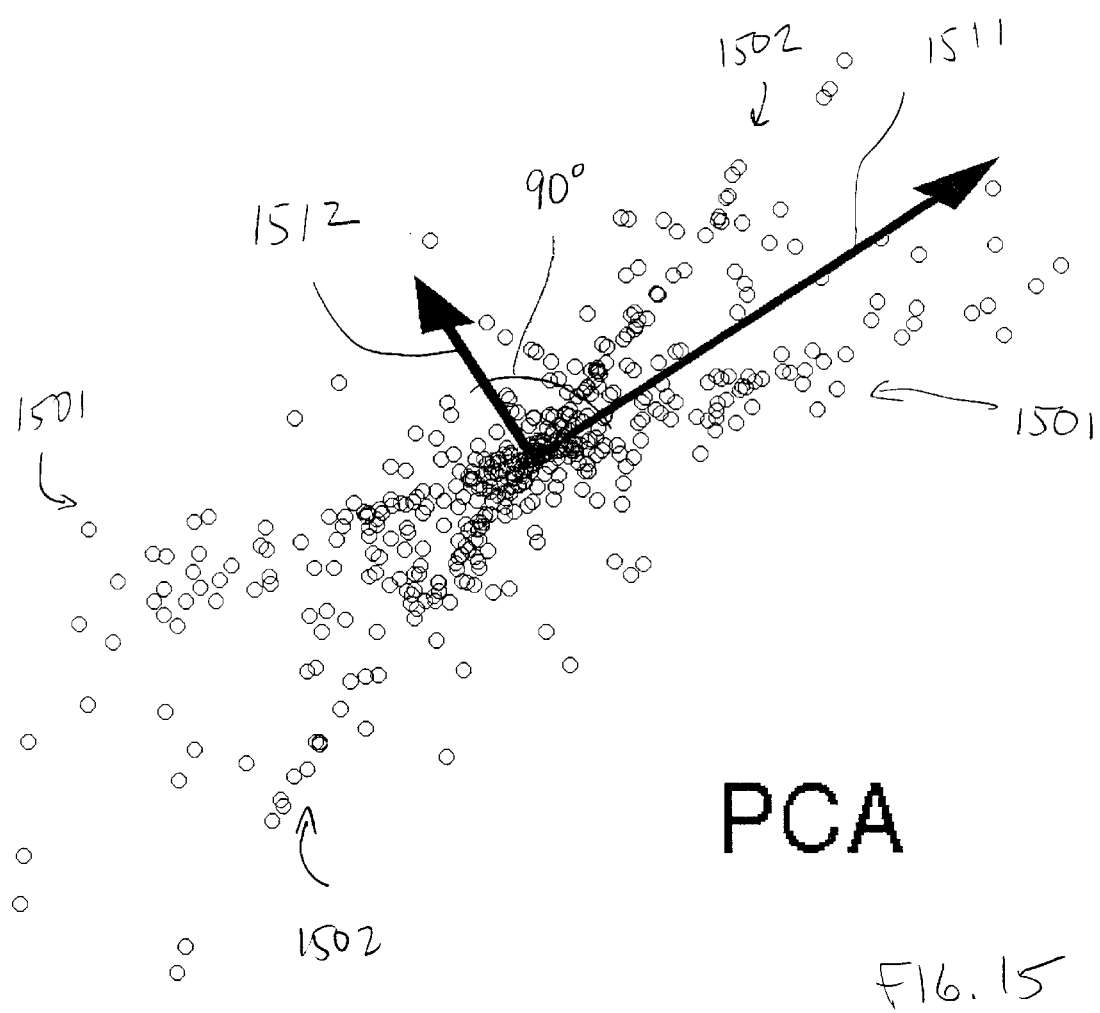
FIG. 15 is a graph of data and PCA basis functions in a two-dimensional space.
Figure 16:
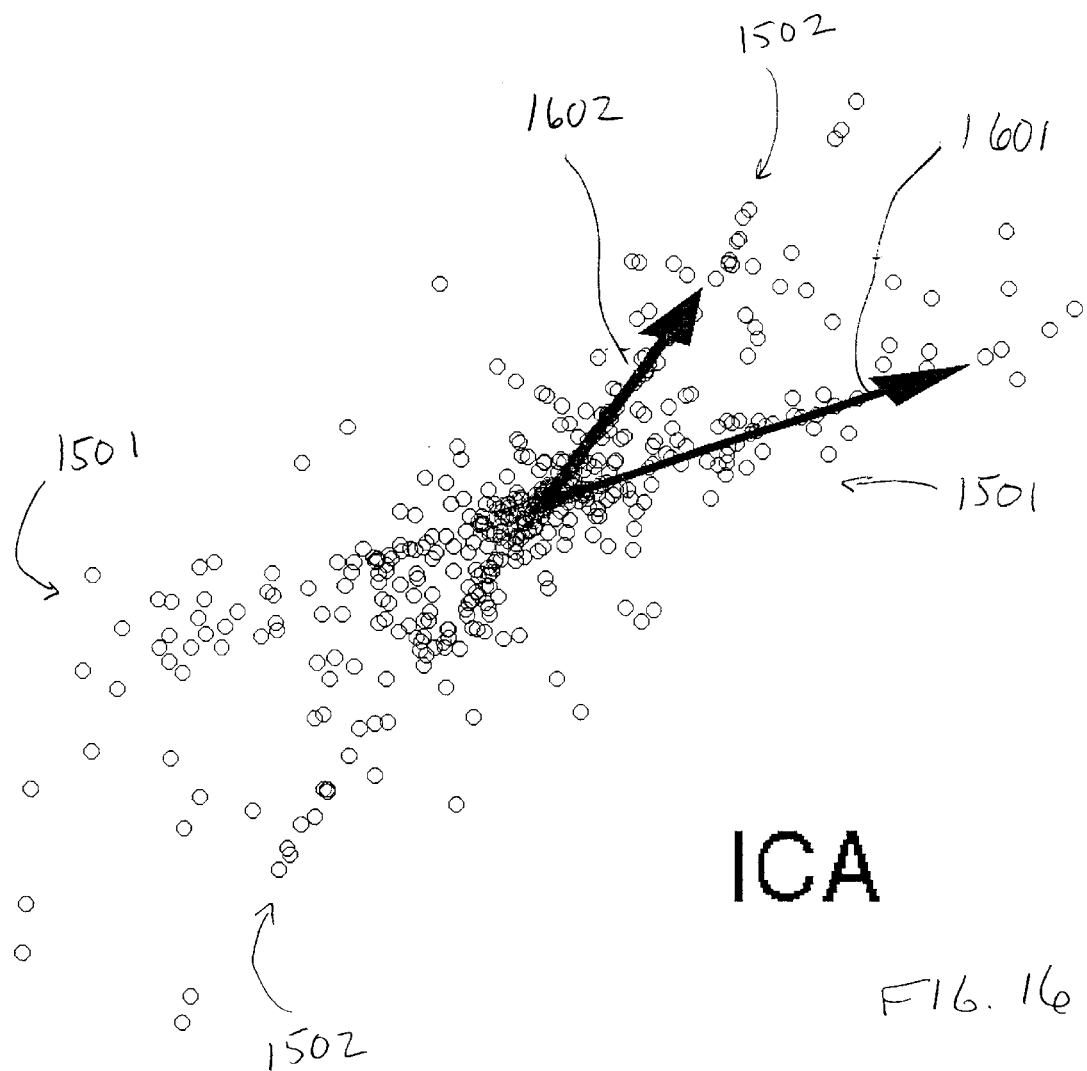
FIG. 16 is a graph the same data as in FIG. 15, and also showing ICA basis functions in a two-dimensional space.

FIGS. 15 and 16 are graphs in an $x_1$-$x_2$ space, where the horizontal axis plots a first data element $x_1$, and the vertical axis plots a second data element $x_2$. The data points are identical in both FIGS. 15 and 16, and for purposes of illustration the data includes two relatively well-defined groups, including a first group shown approximately at 1501 and a second group shown approximately at 1502. It should be noted that actual data has a structure that typically follows a number of different groups; each group having different characteristics; however the number of groups in actual data may vary from one to many, and actual data may be less well-defined in each of the groups. In other words, the data in the groups shown in FIGS. 15 and 16 is simplified for purposes of illustration.

FIG. 15 shows two PCA basis functions including a first PCA basis function 1511 and a second PCA basis function 1512 that is approximately orthogonal (about 90°) to the first PCA basis function. FIG. 16 shows two ICA basis functions including first ICA basis function 1601 and a second ICA basis function 1602 that is non-orthogonal to the first ICA basis function. For ease of illustration, FIGS. 15 and 16 show only two dimensions (i.e. two basis functions). It should be recognized that most implementations require many more dimensions; for example one embodiment of an 8×8 image patch would require 192 dimensions, which is difficult to show graphically.

A comparison between FIGS. 15 and 16 illustrates significant differences between the PCA and ICA basis functions, and shows that the ICA basis functions more efficiently and accurately represent the underlying data. In FIG. 15, the first PCA basis function 1511 approximately follows the first data group 1501; however, the second PCA basis function 1512 significantly deviates from the second data group 1502 because the first PCA basis function is approximately orthogonal (90°) to the second PCA basis function. Accordingly, the representation of the data points as a linear combination of the first and second PCA basis functions is inefficient. However, in FIG. 16, both ICA basis functions approximately follow the data groups; particularly, the first ICA basis function 1601 approximately follows the first data group 1501, and the second ICA basis function 1602 approximately follows the second data group 1502, and therefore the ICA basis functions are clearly more efficient than the PCA basis functions.

PCA basis functions are orthogonal by nature, and in a multi-dimensional representation all PCA basis functions must be approximately orthogonal; i.e. the PCA basis functions are mutually orthogonal with respect to each other. In other words, PCA requires its first basis function to be orthogonal to all other basis functions, its second basis function to be orthogonal to all other basis functions, and so on. In the example of FIG. 15, in which the first and second data groups are not orthogonal, at most one of the basis functions can approximately follow a data group. Using actual data, it is highly unlikely that more than a small number of the PCA basis functions will coincide with the actual groupings typically seen in image data. As a result, an image encoded with PCA basis functions usually requires many basis functions to represent the data; e.g. a single group may require three or more orthogonal functions to represent the image somewhat accurately.

In comparison, the ICA basis functions shown in FIG. 16 are substantially non-orthogonal ($\neq 90°$) to each other. One distinguishing characteristic of ICA basis functions is that at least one ICA basis function (and often many) is non-orthogonal with respect to another ICA basis function, because the ICA basis functions are free to approximately follow the data groups which are typically non-orthogonal. Therefore, ICA basis functions more accurately and efficiently represent data, whereas other types of basis functions such as the PCA basis functions are less efficient and less accurate because they unrealistically constrain the basis functions to be mutually orthogonal. Due to this unrealistic requirement, PCA basis functions cannot efficiently encode most types of data, because the structure of nearly all types of data is not easily grouped along mutually orthogonal axes. Accordingly, using ICA basis functions as shown in FIG. 16, each of the two data groups can be substantially represented with a single respective basis function, and in general images encoded with ICA basis functions are efficiently encoded.

Sparseness of ICA-Encoded Data

ICA-encoded data is represented by a series of coefficients, each coefficient representing the "weight" given to its respective basis function. One observed characteristic of ICA basis functions is that a data set can often be characterized by relatively few of the coefficients; i.e., the coefficients of a data set encoded with ICA basis functions are "sparse", which means that only a few of the basis functions contribute significantly to the ICA characterization of the dataset.

In light of the relative sparseness of ICA basis functions when compared with conventional basis functions, compression techniques are much more effective. Particularly, ICA-encoded data can be compressed into smaller files sizes and/or the data can be compressed more accurately. For example, for nature scenes it is believed that acceptable image quality can be provided if only 15% of the coefficients are saved. For low quality images, only 5% of the coefficients may be needed. A good quality image may require 30% of the coefficients and an excellent quality image may require a higher amount such as 60%. This is in contrast with JPEG basis functions, which may need to send 80–90% of their coefficients in order to provide an excellent quality image.

As discussed above, the ICA-encoded coefficients are sparse: i.e. the data is encoded in such a way that the coefficients are mostly around zero; in other words there is only a small percentage of informative values (non-zero coefficients). From an information coding perspective this means that we can encode and decode the chromatic image patches using only a small percentage of the basis functions. In contrast, Gaussian densities are not sparsely distributed and a large portion of the basis functions are required to represent the chromatic images.

One indication of sparseness is the coding efficiency. The coding efficiency between ICA and PCA can be compared using Shannon's theorem to obtain a lower bound on the number of bits:

$$\#bits \geq -\log_2 P(x_t|A) - N \log_2(\sigma_x)$$

where N is dimensionality of the input spectrum $x_t$, $\sigma_x$ is the coding precision (standard deviation) of the noise introduced by errors in encoding), and $P(x_t|A)$ is the likelihood of the data given the bases.

TABLE A

Spatial-Chromatic Coding Efficiencies Comparing ICA- and PCA-Derived Basis Functions

| Data | Method | Entropy [bits/pixel] | Mutual Information | Normalized Kurtosis |
|---|---|---|---|---|
| Image Patches (Spatial) | ICA | 1.73 | 0.0093 | 19.7 |
| | PCA | 4.46 | 0.0123 | 6.6 |

Referring now to the image patch data in Table A, it can be seen that the ICA method provides a dataset that is more efficient than PCA. The ICA method requires only 1.73 bits in order to represent 8 bits of uncompressed data, whereas the PCA algorithm requires 4.4 bits to represent the same amount of uncompressed data. The improvement from PCA's 4.46 bits/pixel to ICA's 1.73 bits/pixel represents an approximate 160% improvement in encoding efficiency, thus indicating that ICA basis functions encode spatial-chromatic characteristics better than PCA basis functions. Another way to show the improvement in efficiency is using the calculated kurtosis, which is one measure of the "sparseness" of the coefficients. Generally, a larger kurtosis value is more suitable for compression purposes. In the table, the ICA method shows a kurtosis of 19.7, while the PCA method shows a kurtosis of only 6.6, evidencing a much greater suitability of the ICA-derived algorithm for compression. In comparison, the normalized kurtosis for a Gaussian function is zero. Additionally, mutual information was calculated to be 0.0093 for ICA and 0.0123 for PCA, which indicates that ICA has less redundancy within the data and evidences ICA's suitability for compression. Generally, a lower mutual information figure means that the information in the ICA method is more independent, and therefore more efficient. It is believed that ICA algorithms can regularly achieve a mutual information of 1% or less ($\leq 0.01$), although some types of data may show a mutual information or 5% or less ($\leq 0.05$). These results suggest that ICA basis functions sparsely encode sparse data.

Figure 17:
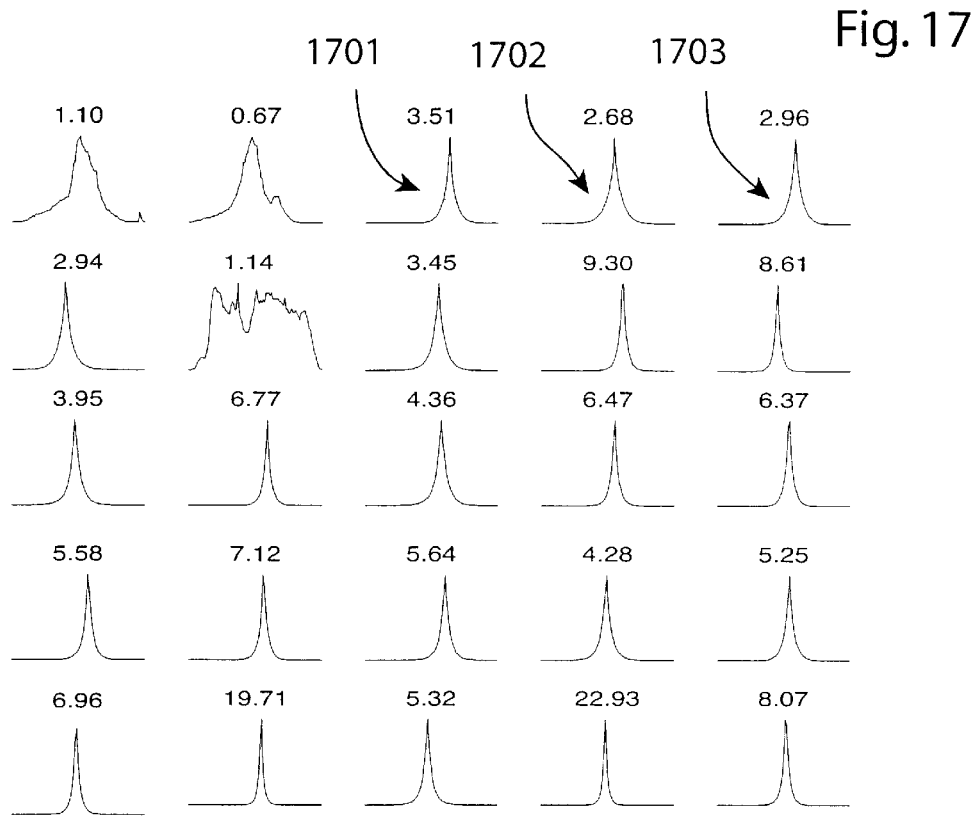
FIG. 17 is a graphical depiction of the normalized coefficients for the twenty-five most significant basis functions of ICA arranged in order of significance, illustrating the relative sparseness of many of the ICA basis functions.
Figure 18:
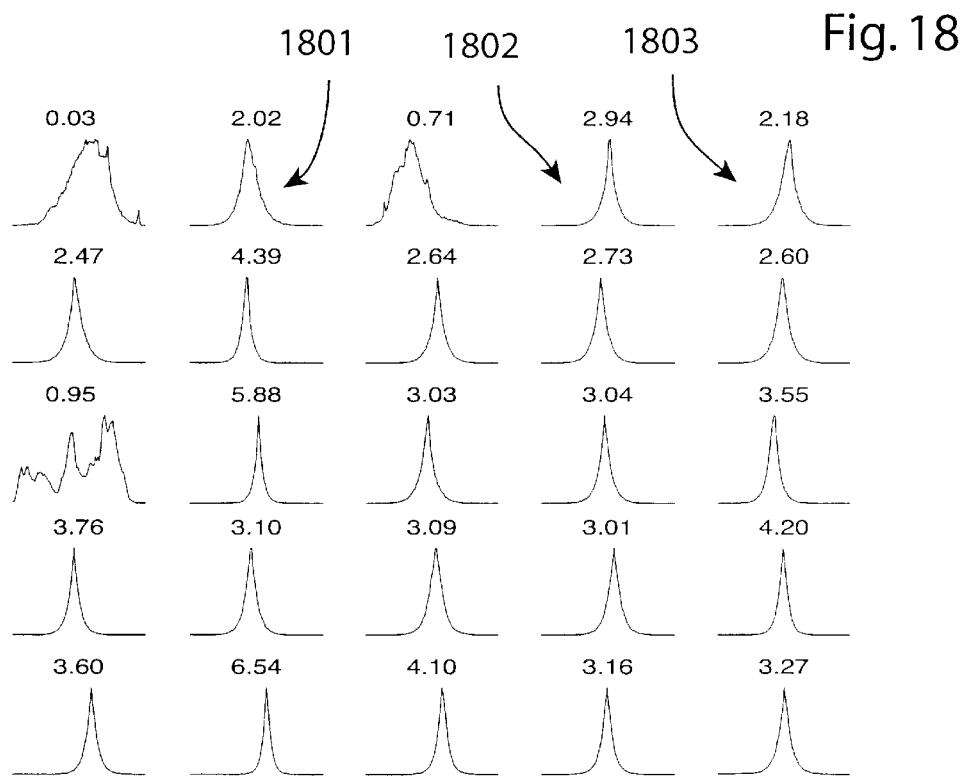
FIG. 18 is a graphical depiction of the normalized coefficients for the twenty-five most significant basis functions of ICA arranged in order of significance, illustrating the relative sparseness of many of the ICA basis functions.

FIG. 17 show results of an experiment in which a large number of natural scenes (40,000 image patches from natural scenes) were encoded using ICA basis functions; for comparison FIG. 18 show results of an experiment in which the same natural scenes were encoded using PCA basis functions so that the sparseness of the coefficients obtained using ICA can be compared with the sparseness of the coefficients obtained using PCA. FIGS. 17 and 18 are graphical depictions that plot the distribution of normalized coefficients for the twenty-five most significant basis functions of ICA arranged in order of contribution. The distributions are histograms of the source values. In FIGS. 17 and 18 the basis functions are arranged by decreasing $L_2$-norm (described below) and each graph also includes a "beta value" that is indicative of the sparseness of that distribution. The beta values shown have been calculated using a maximum a posteriori method. A larger beta corresponds to a sparser coefficient density, i.e. in a very sparse density, most of the coefficients are centered at zero and only few coefficients are non-zero. Generally, a larger beta value and a narrower graph indicates a greater clustering of the contributions of the basis functions around zero; and thus the larger sparseness value indicates the relatively smaller contribution of that basis function.

As mentioned above, the graphs are arranged in terms of decreasing $L_2$-norm, which ranks the relative contribution of each basis function $A=(a_1, a_2, \ldots, a_N)$ according to the following well-known formula:

$$L_2 = \sqrt{a_1 + a_2 + \ldots + a_N}$$

By arranging the basis functions in order of decreasing $L_2$-norm, the basis function having the largest contribution appears on the top row in the left-most position, the basis function having the second largest contribution appears on the top row in the second position, and so forth across the top row, and then repeats for each row. Accordingly, arranging the basis functions in order of decreasing $L_2$-norm is a convenient way of showing the relative contributions of each basis function in a single diagram.

FIG. 17 depicts the substantial clustering of data around zero for many of the ICA basis functions, for example the third, fourth, and fifth graphs shown at 1701, 1702, and 1703 have sparseness values of 3.51, 2.68, and 2.96 respectively. The average of the sparseness values for all twenty-five ICA basis functions is about 6.21. In comparison, FIG. 18, which graphs the coefficients encoded with PCA basis functions, shows a less sparse distribution, indicating that more PCA basis functions are required to encode the same image. The largest sparseness coefficients in the first row are 2.02, 2.94, and 2.18 for the second, fourth, and fifth graphs respectively shown at 1801, 1802, and 1803. The average sparseness value for all PCA basis functions is about 3.08, which is about one-half of the average sparseness for the ICA coefficients. This difference indicates that the ICA basis functions are about twice as efficient as the PCA basis functions in this experiment, and the same image can be represented with about half of the coefficients required by PCA. Generally, FIGS. 17 and 18 show that the ICA basis functions have a greater sparseness than PCA basis functions, and can encode data more efficiently. It should be clear that other implementations may exhibit different average sparseness values, and that the numerical difference between the sparseness values for PCA and ICA may vary between embodiments.

Description of an Example of ICA Basis Functions; and Comparison with PCA Basis Functions As shown at 1420 in FIG. 14, each basis function can be represented in the form of an image patch, which is referred to herein as a basis patch. To construct a basis patch, each element of the basis function defines one respective pixel in the basis patch; i.e., each basis patch is defined by the elements of its respective basis function. Each basis function includes color information for the pixels in its corresponding basis patch, and therefore the chromatic properties of each basis patch (i.e.each basis function) can be represented by the set of pixel coordinates in color space.

Color space refers to the way in which a color is defined; for example RGB color space defines a color in terms of the relative contributions of red, green, and blue in the color. One color space discussed herein—the LMS color space—maps the human eye's response in the form of L, M, and S values. Particularly, the LMS color space is defined in such a way that the L, M, and S values approximately match the response of the L, M, and S cones, and thus, the LMS color space represents color in the form of a linear combination that approximates the response of the human eye. These three wavelength ranges correspond approximately to blue, green, and red. For some applications, LMS space can be approximately converted to RGB space by using known linear transformations. Cone-opponent color space represents a linear transformation of LMS space, with two chromatic axes corresponding to (L-M) and S, and an achromatic axis, as disclosed by MacLeod & Boynton 1979, and Derrington et al 1984 [NOTE Te-Won: I would like the full cites for the above two references] and Stockman, MacLeod and Johnson, *Journal of the Optical Society of America A*, Vol. 10, pp 2491–2521 (1993).

Figure 19A:
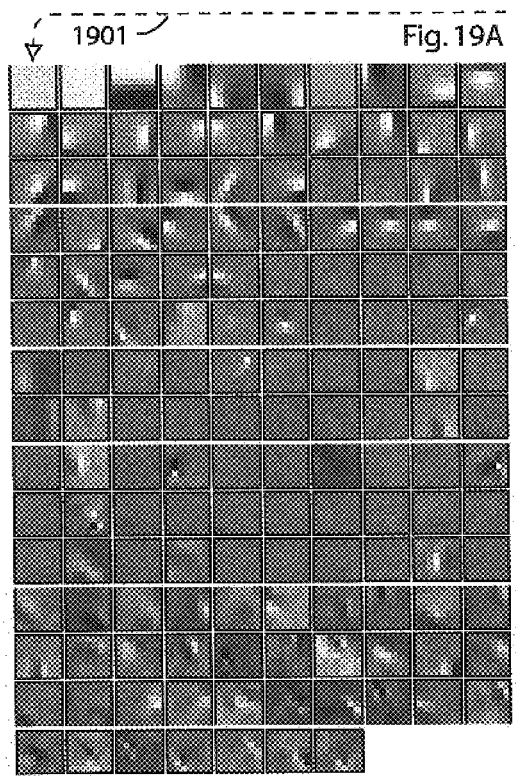
FIG. 19A is a diagram of the image patches of ICA basis functions (the "ICA basis patches") in one example in which the basis functions were trained using the LMS color space.
Figure 19B:
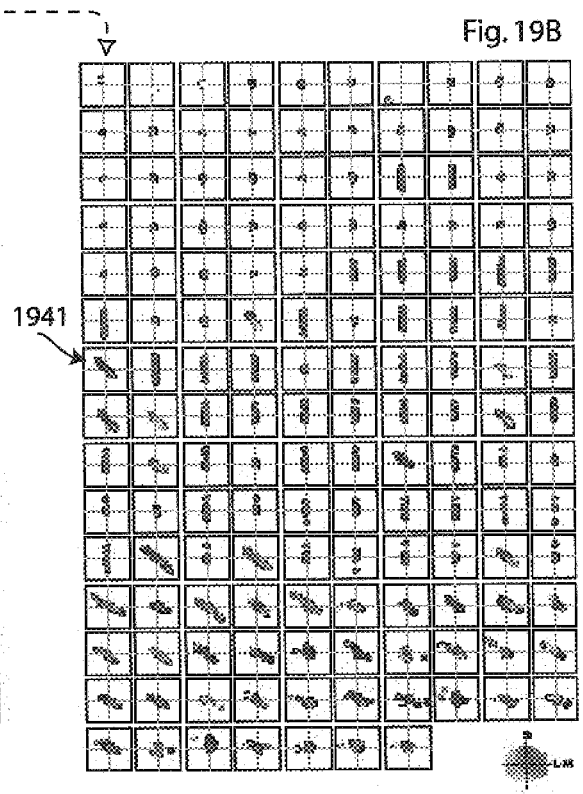
FIG. 19B is a diagram of the color space corresponding to each ICA basis function shown in FIG. 19A.

FIG. 19A shows ICA basis patches arranged in order of decreasing $L_2$-norm, and FIG. 19B shows the color space diagrams corresponding to the basis patches in FIG. 19A; for comparison, FIG. 20A shows PCA basis patches arranged in order of decreasing $L_2$-norm, and FIG. 20B shows color space diagrams corresponding to the basis patches in FIG. 20A. The specific arrangement of FIGS. 19A and 19B is such that the position (row and column) of each image patch in FIG. 19A corresponds to the position (row and column) of the color space diagram shown in FIG. 19B; for example as shown by a dotted line 1901 between FIGS. 19A and 19B, the first row, first column of FIG. 19B shows provides the corresponding color space representation of the pixels shown in the first row, first column of FIG. 19A. The arrangement of FIGS. 20A and 20B likewise provides the one-to-one correspondence between image patch and color space representation. For convenience, the basis functions are referenced herein by number beginning at the first row and numbering across from one to ten, then the second row is numbered across from eleven to twenty, and so forth, thus referring to the basis functions in order of decreasing significance.

The following definitions are used herein to describe the basis functions and their respective color spaces with reference to these figures:

Grayscale basis function: A basis function varying mainly in intensity, represented by a close clustering of points around the achromatic axis of the color space. For example, in FIGS. 19A and 19B grayscale basis functions are shown by the third, fourth, and fifth basis functions.

Homogeneous color basis function: A non-grayscale basis function whose color space is represented by a close clustering of points that form a small circle whose center is offset from the origin. Examples of homogenous color basis functions are shown by the first, second, and seventh basis functions in FIGS. 19A and 19B.

Luminance edge basis functions: A grayscale basis function whose image defines a localized (i.e. non-repeating) boundary between two substantially different shades of gray. Examples of luminance edge basis functions in FIGS. 19A and 19B are the third, fourth, fifth, and sixth basis functions.

Color-opponent basis functions: A basis function whose color space is clustered around a line that approximately extends through the origin. A color-opponent basis function includes the two opposing colors on opposing sides of the origin. Color-opponent basis functions are also color edge basis functions whose image defines a localized (i.e. non-repeating) boundary between the two opposing colors. An example of color-opponent basis functions are the $27^{th}$ and $28^{th}$ basis functions in FIGS. 19A and 19B.

In FIGS. 19A and 20A, the basis patches are shown in an image form, and in FIGS. 19B and 20B, the corresponding color space diagram is shown in a graph in which L-M values are plotted on the horizontal axis and S values are plotted on the vertical axis. In this example, both the ICA and the PCA basis functions were trained using the LMS color space and a similar sample set, and each basis function describes a color space that is a subset of the LMS color space. Other implementations may use other color spaces; for example RGB is a widely-used color space suitable for many uses.

Comparing the ICA image patches in FIG. 19A with the PCA image patches in FIG. 20A reveals significant differences between the ICA basis functions and the PCA basis functions. Nearly all of the ICA basis functions appear as substantially smooth local structures, without abrupt boundaries or artificially repeating structure, like the natural images that they represent. In other terms, the ICA basis functions exhibit a broad spatial frequency spectrum. By comparison, nearly all of the PCA basis functions shown in FIG. 20A exhibit global (i.e. repeating) structures with sharp boundaries (i.e. a narrow spatial frequency spectrum), which is highly uncharacteristic of natural scenes. Particularly, nearly all of the 147 PCA basis patches exhibit repeating structures; only about five do not. Most PCA basis patches exhibit a highly-structured checkerboard pattern; some PCA basis functions even exhibit one checkerboard pattern overlaying a second checkerboard pattern. Accordingly, by simply noting that the checkerboard pattern is not naturally-occurring, it can be observed that these PCA basis functions are not well-suited for encoding natural scenes.

Typically, basis functions are more efficient if they encode primarily one of the following: grayscale luminance edge, homogenous color, and color-opponent basis function. Therefore, a set of basis functions is most efficient if the set is composed primarily of basis functions that are either grayscale luminance edge, homogeneous color, or color-opponent. As will be shown, a large number of the ICA basis functions shown in FIGS. 19A and 19B are either grayscale luminance edge basis functions, homogeneous color, or color-opponent, whereas many of the PCA basis functions are not in that group, or are not as significant.

Looking first at the basis functions having the most contribution to the overall image (i.e. those basis functions in the first few rows), some significant differences appear. One difference is that the ICA basis functions show three homogenous color basis functions in significant positions: positions one, two, and seven. In comparison the PCA basis functions show only two homogeneous color basis functions, and in the less significant positions one and eleven, indicating that color functions is incorporated into some of the non-homogeneous basis functions, which in turn indicates that the PCA basis functions are less efficient.

Another significant difference is that many of the ICA basis functions in the first few rows are grayscale, luminance edge basis functions. Luminance is a dominant characteristic of natural scenes: a large part of the information in natural scenes is composed of luminance, and often it will appear as a luminance edge.

Of the fifty basis functions with the greatest contributions in FIG. 19B (i.e. the top 5 rows), about 40 (80%) are primarily grayscale, and nearly all are luminance edge basis functions. In comparison, the PCA color spaces in FIG. 20B do not exhibit the same grayscale contribution: only about 21 (42%) of the top fifty PCA basis functions are primarily grayscale, which is about one-half of that exhibited by ICA basis functions, and furthermore, only one or two of the 147 PCA basis functions shown in FIG. 20A exhibit luminance edges; instead these PCA functions almost universally show a repeating pattern.

Overall, of the 147 ICA basis functions shown in FIG. 19B, about 48 (about 33%) encode primarily luminance, and almost all of these are luminance edge basis functions. In comparison, only about 21 (about 15%) of the total PCA basis functions shown in FIG. 20B encode primarily luminance, which is about one-half, and almost none of the PCA basis functions are luminance edge basis functions.

Therefore, the ICA basis functions trained with natural scenes exhibit luminance as a dominant characteristic, and typically show luminance edges, which evidences that ICA basis functions can provide efficient encoding. For other types of scenes, the ICA basis functions may exhibit less dominance by luminance; for example in other embodiments in which the ICA basis functions are trained for different types of scenes, the percentage of luminance edge basis functions may be around 60% of the first fifty, or even 50%, and 30%–40% overall.

There is evidence that the human eye-brain connection processes luminance differently than color information, and therefore the large number of luminance-dominated basis functions could be useful. For example, in image processing applications it has been difficult to increase the brightness of the image without changing the color balance. This problem could be addressed by encoding the image with ICA basis functions, and then selectively increasing the coefficients of the grayscale basis functions, thereby increasing the brightness while preserving the color integrity.

In addition to luminance edge basis functions and homogeneous color basis functions, the ICA basis functions shown in FIGS. 19A and 19B also include a large number of chromatic basis functions that primarily encode color (e.g. 90%), whereas a larger number of the chromatic PCA basis functions substantially encode both color and grayscale. For example, in FIG. 20B, PCA color spaces 2011, 2012, 2013, 2014, 2015, and 2016 exhibit widely-ranging non-linear configurations centered about the origin, which indicates encoding of both grayscale and color. None of the ICA color spaces exhibit such widely-ranging patterns; and instead many of the chromatic ICA basis functions are primarily color-opponent and non-orthogonal, as will be described. Generally, it is more efficient to encode luminance and color separately, and therefore the ICA basis functions appear to be more efficient.

In the color space diagrams of FIGS. 19B and 20B, color-opponency is evidenced in the pixel clusters that approximately define an axis through the origin. For example, color-opponent basis functions include the basis function shown at 1941 in FIG. 19B and the basis function shown at 2021 in FIG. 20B. Of the chromatic basis functions, nearly all of the chromatic ICA basis functions (shown in FIG. 19B) exhibit color opponency, while a significant portion of the chromatic PCA color spaces (e.g. 20%) appear to be non-color opponent. In general, color-opponent basis functions are more efficient at encoding information, and therefore, the ICA basis functions are more efficient overall.

Non-Orthogonal Basis Functions

A comparison between the color-opponent ICA basis functions of FIG. 19B and the color-opponent PCA basis functions of FIG. 20B shows another significant difference: many of the color-opponent ICA basis functions are non-orthogonal with respect to each other as evidenced by color space; particularly, a basis function is non-orthogonal if the color-opponent axis of a basis functions is non-orthogonal to the color-opponent axis of another basis functions) while none of the color-opponent PCA basis functions are non-orthogonal (i.e. all of color-opponent PCA color spaces follow one or the other principal axis, and are therefore orthogonal to each other). This shows that the PCA color spaces are unnaturally constrained along the principal axes, which limits their efficiency. In comparison the ICA basis functions are free to assume the color-opponent direction that is most appropriate, and therefore are more efficient. In the example of FIG. 19B, the ICA basis functions show strong opponency along a blue-yellow direction, and along a red-blue direction. The angle of color-opponency is around 130° to 140°, (135°) such as shown in the 70th basis function in FIG. 19B (shown at 1941), which is indicative of the colors typically found in the natural scenes used in training. In other embodiments the color-opponent basis functions could have an angle in the color space could be anywhere from 0° to 360°, and the color-opponent basis functions for one set may have a number of different non-orthogonal angles in the color space; for example one color-opponent angle could be 45°, another color-opponent angle in the same set could be 110°, and so forth.

In summary, PCA basis functions unnaturally restrict the color space of all of the basis functions in accordance with the imposed orthogonality requirement, and therefore the PCA basis functions characteristically exhibit a color space aligned with one of the two principal axes. In comparison, the ICA basis functions are not constrained to be orthogonal, and therefore the ICA basis functions are free to assume a direction in the color space that is more efficient. Thus it is believed that ICA basis functions are more efficient at representing color, in addition to more efficiently representing the image as a whole.

Discussion of Color-Opponency and Encoding

Color-opponency is a description of the way in which color information is encoded by sensors or other physical receptors. For a set of sensors, each of which is sensitive over a different, limited spectral range, the differences between the sensor outputs comprise a color-opponent code. The spectral ranges may overlap to some degree. In a color-opponent code, what is represented is not the absolute radiance values, but rather the variations across wavelengths. This definition of color opponency applies regardless or the sensors (or emitters), so it would hold for human cones (LMS color space), CCD cameras (RGB color space), and other natural or artificial vision systems. Color opponency also applies to non-visible radiation; where the more general term "spectral opponency" may be more appropriate; e.g. color opponency can be used for artificial multi-spectral systems that sample outside the visible range. Although color spaces typically are defined by only three values, alternative color spaces could use four or more values to define a "color", for example some birds and invertebrates utilize four or more receptor types that include UV receptors. The human visual system encodes the chromatic signals conveyed by the three types of retinal cone photoreceptors in a color opponent fashion. This color opponency has been shown to constitute an efficient encoding by spectral decorrelation of the receptor signals.

The definition of color opponency is largely independent of the color space, as long as the coordinates correspond to sensors with the specified properties, such as LMS, and RGB. Other color spaces, like perceptual color spaces CIE Luv and Lab, already incorporate some opponency; i.e. they encode comparisons between different parts of the spectrum; to achieve a description that corresponds to human color perception; and accordingly there is no overall definition of how efficient codes would look like for such color spaces.

The exact values of the opponency obtained by the method described herein will be different for different systems, but will always incorporate the spectral relations in the training data, to the extent that they are captured by the set of sensors. Accordingly, for better encoding, the basis functions that are used to encode data should be trained in the color space of the data; for example if RGB data is to be encoded, then the basis functions should be trained with RGB data. However, due to the existence of various color spaces, it may be necessary to convert one color space to another before encoding.

It will be appreciated by those skilled in the art, in view of these teachings, that alternative embodiments may be implemented without deviating from the spirit or scope of the invention. For example, various combinations of the described techniques for encoding, compressing, and decoding images may be utilized as appropriate. This invention is to be limited only by the following claims, which include all such embodiments and modifications when viewed in conjunction with the above specification and accompanying drawings.

What is claimed is:

1. A method of encoding a patch of an image, comprising the steps of:
    defining at least one data vector using data from said patch;
    encoding said data vector including applying a non-orthogonal set of basis functions to provide a source vector that includes a plurality of calculated coefficients having values representative of said patch, and compressing said corresponding source vector including selecting a subset of said plurality of calculated coefficients, thereby providing an encoded vector.

2. The method of claim 1 wherein said non-orthogonal set of basis functions is defined by a plurality of vectors, and at least two of said vectors are non-orthogonal with respect to each other.

3. The method of claim 1 wherein said set of basis functions defines a corresponding set of image patches, and said image patches comprise primarily non-repeating image patches.

4. The method of claim 1 wherein said set of basis functions define a corresponding set of color spaces defined within two principal axes, and wherein said set of color spaces include at least two color-opponent basis functions that define color spaces whose axes are non-orthogonal with respect to each other.

5. The method of claim 1 wherein at least three of the ten most contributive basis functions are primarily homogeneous color basis functions.

6. The method of claim 1 wherein said set of basis functions define a corresponding set of color spaces, wherein said set of basis functions are arranged in order of decreasing contribution, and at least 60% of a first group including the most contributive basis functions define substantially homogenous color basis functions and grayscale luminance edge basis functions.

7. The method of claim 1 wherein at least 30% of said basis functions define substantially grayscale luminance edge basis functions.

8. The method of claim 1 wherein at least about 60% of the fifty most contributive basis functions define substantially grayscale basis functions.

9. The method of claim 1 wherein at least 65% of the basis functions in said set of basis functions are primarily one of luminance edge, homogenous color, and color-opponent.

10. The method of claim 9 wherein at least 80% of the basis functions in said set of basis functions are primarily one of luminance edge, homogenous color, and color-opponent.

11. The method of claim 9 wherein at least 95% of the basis functions in said set of basis functions are primarily one of luminance edge, homogenous color, and color-opponent.

12. The method of claim 9 wherein said set of basis functions include at least two color-opponent basis functions that define color spaces whose axes are non-orthogonal with respect to each other.

13. The method of claim 1 wherein said non-orthogonal basis functions include two or more classes, and said step of encoding said patch includes calculating the source vectors for each of said classes, classifying said patch into one of said classes, and selecting the source vector associated with said class.

14. The method of claim 1 wherein said step of compressing said source vectors includes selecting a plurality of coefficients having predetermined positions within the source vector, thereby selecting coefficients associated with predetermined basis functions.

15. The method of claim 1 wherein said step of compressing said source vectors includes selecting a group of coefficients by selecting the largest coefficient values.

16. The method of claim 1 wherein said step of compressing said source vectors includes selecting coefficients whose values exceed a predetermined threshold.

17. The method of claim 1, further comprising a wavelet method including:
    selecting a patch for level 1, and then encoding said level 1 patch using a first set of non-orthogonal basis functions to provide encoded image data;
    processing said level 1 patch to provide two or more level 2 patches, including subdividing said level 1 patch; and
    encoding said level 2 patches using a second set of non-orthogonal basis functions.

18. The method of claim 17 wherein processing said Level 1 patch further comprises:
    providing a difference image including calculating an image patch responsive to said encoded image data and subtracting said calculated image patch from said first level image patch; and subdividing said difference image.

19. The method of claim 1, wherein each of said basis functions has a probability density function (pdf) variable associated therewith that designates the underlying statistical distribution, and further comprising the step of encoding said image data using said pdf variables associated with said basis functions.

20. The method of claim 19, wherein said pdf variables designate the underlying statistical distribution as one of sub-Gaussian, normal Gaussian, and super-Gaussian.

21. The method of claim 1, further comprising transmitting said plurality of encoded vectors.

22. The method of claim 21, further comprising decoding said plurality of encoded vectors to provide a plurality of reconstructed data vectors.

23. The method of claim 22, further comprising forming said image using said reconstructed data vectors.

24. A method of encoding, transmitting, and decoding an image defined by a plurality of pixels arranged in an array, comprising the steps of:
    dividing said image into a plurality of pixel patches, each pixel having at least one data value associated therewith;
    for each pixel patch, arranging said data values from said patch into at least one data vector;
    for each of said data vectors, encoding said data vector including
    applying a non-orthogonal set of basis functions to provide a source vector that includes a plurality of coefficients having values representative of the corresponding patch, and
    compressing said corresponding source vector including selecting a subset of said plurality of coefficients, thereby providing an encoded vector; transmitting said plurality of encoded vectors; and
    decoding said plurality of said encoded vectors to provide a plurality of reconstructed data vectors.

25. The method of claim 24 wherein said non-orthogonal set of basis functions is defined by a plurality of vectors, and at least two of said vectors are non-orthogonal with respect to each other.

26. The method of claim 24 wherein said set of basis functions defines a corresponding set of image patches, and said image patches comprise primarily non-repeating image patches.

27. The method of claim 24 wherein said set of basis functions define a corresponding set of color spaces defined within two principal axes, and wherein said set of color spaces include at least two color-opponent basis functions that define color spaces whose axes are non-orthogonal with respect to each other.

28. The method of claim 24 wherein at least three of the ten most contributive basis functions are primarily homogeneous color basis functions.

29. The method of claim 24 wherein said set of basis functions define a corresponding set of color spaces, wherein said set of basis functions are arranged in order of decreasing contribution, and at least 60% of a first group including the most contributive basis functions define substantially homogenous color basis functions and grayscale luminance edge basis functions.

30. The method of claim 24 wherein at least 30% of said basis functions define substantially grayscale luminance edge basis functions.

31. The method of claim 24 wherein at least about 60% of the fifty most contributive basis functions define substantially grayscale basis functions.

32. The method of claim 24 wherein at least 65% of the basis functions in said set of basis functions are primarily one of luminance edge, homogenous color, and color-opponent.

33. The method of claim 32 wherein at least 80% of the basis functions in said set of basis functions are primarily one of luminance edge, homogenous color, and color-opponent.

34. The method of claim 32 wherein at least 95% of the basis functions in said set of basis functions are primarily one of luminance edge, homogenous color, and color-opponent.

35. The method of claim 32 wherein said set of basis functions include at least two color-opponent basis functions that define color spaces whose axes are non-orthogonal with respect to each other.

36. The method of claim 24 wherein said non-orthogonal basis functions include two or more classes, and said step of encoding said patch includes calculating the source vectors for each of said classes, classifying said patch into one of said classes, and selecting the source vector associated with said class.

37. The method of claim 24, further comprising a wavelet method including:
    selecting a patch for level 1, and then encoding said level 1 patch using a first set of non-orthogonal basis functions to provide encoded image data;

processing said level 1 patch to provide two or more level 2 patches, including subdividing said level 1 patch; and encoding said level 2 patches using a second set of non-orthogonal basis functions.

38. A method of decoding encoded image data comprising:

identifying the compression technique used to encode said encoded image data;

reconstructing source vectors from said encoded image data responsive to said identified compression technique;

calculating image data by applying non-orthogonal basis functions to said reconstructed source vectors; and displaying said calculated image data.

39. The method of claim 38 wherein said non-orthogonal set of basis functions is defined by a plurality of vectors, and at least two of said vectors are non-orthogonal with respect to each other.

40. The method of claim 38 wherein said set of basis functions defines a corresponding set of image patches, and said image patches comprise primarily non-repeating image patches.

41. The method of claim 38 wherein said set of basis functions define a corresponding set of color spaces defined within two principal axes, and wherein said set of color spaces include at least two color-opponent basis functions that define color spaces whose axes are non-orthogonal with respect to each other.

42. The method of claim 38 wherein at least three of the ten most contributive basis functions are primarily homogeneous color basis functions.

43. The method of claim 38 wherein said set of basis functions define a corresponding set of color spaces, wherein said set of basis functions are arranged in order of decreasing contribution, and at least 60% of a first group including the most contributive basis functions define substantially homogenous color basis functions and grayscale luminance edge basis functions.

44. The method of claim 38 wherein at least 30% of said basis functions define substantially grayscale luminance edge basis functions.

45. The method of claim 38 wherein at least about 60% of the fifty most contributive basis functions define substantially grayscale basis functions.

46. The method of claim 38 wherein at least 65% of the basis functions in said set of basis functions are primarily one of luminance edge, homogenous color, and color-opponent.

47. The method of claim 46 wherein at least 80% of the basis functions in said set of basis functions are primarily one of luminance edge, homogenous color, and color-opponent.

48. The method of claim 46 wherein at least 95% of the basis functions in said set of basis functions are primarily one of luminance edge, homogenous color, and color-opponent.

49. The method of claim 46 wherein said set of basis functions include at least two color-opponent basis functions that define color spaces whose axes are non-orthogonal with respect to each other.

50. An encoder for encoding an image divided into a plurality of patches, each patch defining at least one data vector, comprising:

a calculation system that applies a non-orthogonal set of basis functions to each of said data vectors to provide a source vector that includes a plurality of calculated coefficients having values representative of said patch; and a compression system that compresses said corresponding source vector by selecting a subset of said plurality of calculated coefficients, thereby providing an encoded vector.

51. The method of claim 50 wherein said non-orthogonal set of basis functions is defined by a plurality of vectors, and at least two of said vectors are non-orthogonal with respect to each other.

52. The encoder of claim 50 wherein said set of basis functions defines a corresponding set of image patches, and said image patches comprise primarily non-repeating image patches.

53. The encoder of claim 50 wherein said set of basis functions define a corresponding set of color spaces defined within two principal axes, and wherein said set of color spaces include at least two color-opponent basis functions that define color spaces whose axes are non-orthogonal with respect to each other.

54. The encoder of claim 50 wherein at least three of the ten most contributive basis functions are primarily homogeneous color basis functions.

55. The encoder of claim 50 wherein said set of basis functions define a corresponding set of color spaces, wherein said set of basis functions are arranged in order of decreasing contribution, and at least 60% of a first group including the most contributive basis functions define substantially homogenous color basis functions and grayscale luminance edge basis functions.

56. The encoder of claim 50 wherein at least 30% of said basis functions define substantially grayscale luminance edge basis functions.

57. The encoder of claim 50 wherein at least about 60% of the fifty most contributive basis functions define substantially grayscale basis functions.

58. The encoder of claim 50 wherein at least 65% of the basis functions in said set of basis functions are primarily one of luminance edge, homogenous color, and color-opponent.

59. The encoder of claim 58 wherein at least 80% of the basis functions in said set of basis functions are primarily one of luminance edge, homogenous color, and color-opponent.

60. The encoder of claim 58 wherein at least 95% of the basis functions in said set of basis functions are primarily one of luminance edge, homogenous color, and color-opponent.

61. The encoder of claim 58 wherein said set of basis functions include at least two color-opponent basis functions that define color spaces whose axes are non-orthogonal with respect to each other.

62. A decoder for decoding image data comprising:

an identification system that identifies the compression technique used to encode said encoded image data;

a reconstruction system for reconstructing source vectors from said encoded image data responsive to said identified compression technique;

means for calculating image data by applying non-orthogonal basis functions to said reconstructed source vectors; and a display system for displaying said calculated image data.

63. The method of claim 62 wherein said non-orthogonal set of basis functions is defined by a plurality of vectors, and at least two of said vectors are non-orthogonal with respect to each other.

64. The decoder of claim 62 wherein said set of basis functions defines a corresponding set of image patches, and said image patches comprise primarily non-repeating image patches.

65. The decoder of claim 62 wherein said set of basis functions define a corresponding set of color spaces defined within two principal axes, and wherein said set of color spaces include at least two color-opponent basis functions that define color spaces whose axes are non-orthogonal with respect to each other.

66. The decoder of claim 62 wherein at least three of the ten most contributive basis functions are primarily homogeneous color basis functions.

67. The decoder of claim 62 wherein said set of basis functions define a corresponding set of color spaces, wherein said set of basis functions are arranged in order of decreasing contribution, and at least 60% of a first group including the most contributive basis functions define substantially homogenous color basis functions and grayscale luminance edge basis functions.

68. The decoder of claim 62 wherein at least 30% of said basis functions define substantially grayscale luminance edge basis functions.

69. The decoder of claim 62 wherein at least about 60% of the fifty most contributive basis functions define substantially grayscale basis functions.

70. The decoder of claim 62 wherein at least 65% of the basis functions in said set of basis functions are primarily one of luminance edge, homogenous color, and color-opponent.

71. The decoder of claim 70 wherein at least 80% of the basis functions in said set of basis functions are primarily one of luminance edge, homogenous color, and color-opponent.

72. The decoder of claim 70 wherein at least 95% of the basis functions in said set of basis functions are primarily one of luminance edge, homogenous color, and color-opponent.

73. The decoder of claim 70 wherein said set of basis functions include at least two color-opponent basis functions that define color spaces whose axes are non-orthogonal with respect to each other.

* * * * *